United States Patent
Agrawal et al.

(10) Patent No.: US 12,548,071 B2
(45) Date of Patent: Feb. 10, 2026

(54) METHOD, SYSTEM, AND COMPUTER PROGRAM PRODUCT FOR SELECTIVE AUGMENTED REALITY OBJECT REPLACEMENT

(71) Applicant: International Business Machines Corporation, Armonk, NY (US)

(72) Inventors: Tushar Agrawal, West Fargo, ND (US); Jeremy R. Fox, Georgetown, TX (US); Raghuveer Prasad Nagar, Kota (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 18/149,347

(22) Filed: Jan. 3, 2023

(65) Prior Publication Data
US 2024/0221060 A1    Jul. 4, 2024

(51) Int. Cl.
*G06Q 30/00*    (2023.01)
*G06Q 30/0601*    (2023.01)
*G06T 19/00*    (2011.01)

(52) U.S. Cl.
CPC ..... *G06Q 30/0643* (2013.01); *G06Q 30/0631* (2013.01); *G06T 19/006* (2013.01)

(58) Field of Classification Search
None
See application file for complete search history.

(56) References Cited

U.S. PATENT DOCUMENTS

| | | |
|---|---|---|
| 10,176,642 B2 | 1/2019 | Tran |
| 11,062,314 B1 | 7/2021 | Ramanathan |

(Continued)

FOREIGN PATENT DOCUMENTS

| | | |
|---|---|---|
| CN | 111357029 | 6/2020 |
| KR | 1020180021116 A | 2/2018 |

OTHER PUBLICATIONS

Anonymous, "Delivery of AR Content When Travelling", An IP.com Prior Art Database Technical Disclosure, Authors et al.: Disclosed Anonymously, IP.com No. IPCOM000220220D, IP.com Electronic Publication Date: Jul. 25, 2012, pp. 1-6. (Year: 2012).*

(Continued)

*Primary Examiner* — Jeffrey A. Smith
*Assistant Examiner* — Brittany E Bargeon
(74) *Attorney, Agent, or Firm* — Teddi E. Maranzano

(57) ABSTRACT

An approached is disclosed that selectively replaces physical objects with virtual objects viewable in augmented reality. Selective replacement is based on user location and corresponding preferences mapped to location clusters. AI systems learn user preferences for location clusters and derive object preferences for users depending on location. Preferences and priorities for objects within each location cluster are derived using location data, purchase histories, IoT data, social media, communication data and other data sources. AI systems implement algorithms to predict levels of engagement between users and objects of a particular location cluster and as objects around the user are predicted to be uninteresting to the user, uninteresting objects may be replaced within AR environments using AR image overlay techniques with new objects having an interest rating above a threshold level. Replacement objects are purchasable through the AR interface, whereby users select objects to purchase and initiate delivery.

9 Claims, 10 Drawing Sheets

(56) References Cited

U.S. PATENT DOCUMENTS

| | | | |
|---|---|---|---|
| 2010/0198653 A1* | 8/2010 | Bromenshenkel | G06Q 30/06 715/757 |
| 2011/0184831 A1* | 7/2011 | Dalgleish | G06Q 30/0631 705/26.7 |
| 2013/0085345 A1 | 4/2013 | Geisner | |
| 2016/0242010 A1 | 8/2016 | Parulski | |
| 2018/0225880 A1 | 8/2018 | Yasutake | |
| 2019/0156393 A1* | 5/2019 | Yankovich | G06Q 30/0241 |
| 2020/0342368 A1 | 10/2020 | Vangala | |
| 2022/0374959 A1* | 11/2022 | Gobalakrishna | G06Q 30/0621 |

OTHER PUBLICATIONS

International Searching Authority, "Notification of Transmittal of the International Search Report and the Written Opinion of the International Searching Authority, or Declaration," Patent Cooperation Treaty, Jun. 27, 2024, 07 pages, International Application No. PCT/IB2023/062994.

Anonymous, "How to replace an AR object, positioned in space?", Stack Overflow, downloaded from the internet on Oct. 7, 2022, <https://stackoverflow.com/questions/44785940/how-to-replace-an-ar-object-positioned-in-space>, 7 pages.

Anonymous, "AI-based Purchase Predictions for Online and Retail Customers", An IP.com Prior Art Database Technical Disclosure, Authors et al.: Disclosed Anonymously, IP.com No. IPCOM000266124D, IP.com Electronic Publication Date: Jun. 15, 2021, 6 pages.

Anonymous, "Delivery of AR Content When Travelling", An IP.com Prior Art Database Technical Disclosure, Authors et al.: Disclosed Anonymously, IP.com No. IPCOM000220220D, IP.com Electronic Publication Date: Jul. 25, 2012, 3 pages.

Anonymous, "Needs Aware Augmented Reality System", An IP.com Prior Art Database Technical Disclosure, Authors et al.: Disclosed Anonymously, IP.com No. IPCOM000235630D, IP.com Electronic Publication Date: Mar. 14, 2014, 3 pages.

Chalimov, Alexey, "Bringing Augmented Reality to Your Retail App", Eastern Peak, updated on Oct. 20, 2021, <https://easternpeak.com/blog/bringing-augmented reality-to-your-retail-app/>, 24 pages.

Chen et al., "Virtual Object Replacement Based on Real Environments: Potential Application in Augmented Reality Systems", Appl. Sci. 2019, 9, 1797; doi:10.3390/app9091797, Published: Apr. 29, 2019, 21 pages.

Cook et al., "Augmented shopping: The quiet revolution", Deloitte Insights, Jan. 10, 2020, <https://www2.deloitte.com/us/en/insights/topics/emerging-technologies/augmented-shopping-3d-technology-retail.html>, 15 pages.

Dahl, Tyler, "Real-Time Object Removal in Augmented Reality", A Thesis presented to the Faculty of California Polytechnic State University, San Luis Obispo, Jun. 2018, <https://digitalcommons.calpoly.edu/theses/1905/>, 96 pages.

Ortiz et al., "How Extended Reality will reshape commerce", IBM, Dec. 2019, <https://www.ibm.com/ downloads/cas/GAZR2Z69>, 8 pages.

* cited by examiner

METHOD, SYSTEM, AND COMPUTER PROGRAM PRODUCT FOR SELECTIVE AUGMENTED REALITY OBJECT REPLACEMENT

BACKGROUND

The present disclosure relates generally to the field of artificial intelligence (AI) and augmented reality (AR) systems. More specifically, the use of AI to learn user preferences based on different location clusters specific to each user, and depending on the current location of the user, selectively replace objects of low priority to the user for that location cluster with higher priority virtual objects, displayed within an AR environment, that are relevant to the preferences of the user. Augmented reality refers to an interactive experience that combines visual elements of both the real physical objects and environments with computer-generated content. Augmented reality devices can superimpose computer-generated images and artifacts onto the user's view of the real world, resulting in a composite view of both real physical objects and/or environments alongside computer-generated objects, when viewed through an AR display system. AR display systems can be portable and easily worn while traveling to different locations, and may be in the form of a headset, glasses, mobile device, tablets or other types of systems.

Traveling has become an essential part of everyday life for many people. Travel can be routine travel, such as a daily commute between home and office, or travel may be event driven. For example, event driven travel can include traveling for a vacation, a get-together with friends or family, business meetings, or conferences. Over time, the usage of AR devices has become increasingly integrated into the daily life of individuals while they travel and can be used while traveling both physically and virtually. While AR device users are traveling to different locations, not every object that is observable via the AR viewing system will be interesting or relevant to the user at each location they visit. Interest in various objects (whether real or computer-generated) can vary depending on the locations. For example, a first user may enjoy foods that are more familiar to them while on vacation, but a first user may also be willing to try new experiences while they are close to home; whereas a second user may be more interested in experiencing authentic local cuisine of the region or location while on vacation but may tend to follow a routine that prefers frequenting the same places while they are closer to home. If the first user and the second user visit the same location on vacation and view their surroundings using an AR viewing device, the items displayed by the shops, retail outlets, and restaurants offering local food may be interesting and relevant to the second user but not the first user. Moreover, the AR viewing experience may also differ for the same user depending on their current location. For instance, a different AR viewing experience may be appropriate when the first user or second user is at home or the office when compared with when the first user or second user is on vacation.

Current AR viewing systems lack the ability to predictably automate and adjust AR viewing environments, and objects presented therein, based on changes in user preferences, interests or user behaviors corresponding to different location classifications. There is a need for AR viewing environments to take into account not only personal preferences of individual users, but also consider changes in preferences of the user as the user is positioned within different types of locations when viewing augmented reality using an AR device. Such consideration of the context of the surrounding location can provide the most relevant objects and products of interest to the user during their viewing experience. Omitting or removing uninteresting or undesirable objects from the user's view within a particular type of location can increase engagement of the user with the surrounding AR environment and increase opportunities for virtually-initiated sales of objects that may be made available for purchase via the AR environment.

SUMMARY

Embodiments of the present disclosure relate to computer-implemented methods, associated computer systems and computer program products for selectively overlaying representations of physical objects within an augmented reality environment with renderings of replacement objects that are viewable through an augmented reality device. The disclosure recognizes that there are advantages to differentiating between levels of interest and preferences of a user toward viewing different objects in certain locations and environments (referred to herein as location clusters), and as a result of changing preferences, overlaying the different replacement objects within the AR environments depending on the type of location cluster that the user is currently viewing objects; in order to present objects within the AR environment that are most interesting to the user for a particular location cluster. Removing or replacing objects that are irrelevant or uninteresting.

Embodiments of computer-implemented methods, associated computer systems, and computer program products for overlaying replacement objects within an AR environment may create one or more location clusters corresponding to a user. Location clusters can be identified from user data generated within one or more locations that make up each of the location clusters. A level of interest in one or more objects observed by the user within each of the location clusters are classified using one or more classification techniques, wherein the level of interest is derived by assigning a value or score to the one or more objects within the location clusters. The one or more objects being classified are prioritized for each of the location clusters based on the values assigned to the one or more objects of the location clusters. Predictions are generated for the one or more objects within a physical environment of a current location, based on whether a predicted level of interest by the user falls below a threshold level for a location cluster corresponding to the current location; and selectively replacing the one or more objects of the current location having the level of interest below the threshold level by overlaying a rendered image of a replacement object that is viewable through an augmented reality (AR) viewing device, wherein the replacement object has the level of interest for the user that is above a threshold level for the location cluster.

Additional embodiments of the computer-implemented method, associated computer system, and computer program products, may include additional optional steps, including a step of fetching user data from one or more data sources and discovering from the user data being fetched, the user's interactions with their surroundings, mobility patterns, shopping habits and product attributes that the user finds most interesting within each location cluster. When creating the different location clusters, the location clusters can be created based on location data collected from the user's purchase history, user explicit preferences, publicly available data, social media and/or internet-of-things (IoT) data.

In some additional embodiments, the computer-implemented method, associated computer system, and computer program products may optionally display a source provider of the replacement objects being viewed through an AR viewing device. The replacement object being viewed through the AR viewing device can be selected for purchase. By selecting the replacement object, a payment transaction may be performed through the AR interface of the AR viewing device, and upon completion of payment using the AR interface, a physical version of replacement object can be tendered to the user by initiating shipment of the physical version of the replacement object to an address designated by the user during the completion of the payment transaction.

Embodiments of the computer-implemented method, associated computer system, and computer program products may optionally import sharable profiles indicating preferences a second user. The sharable profile classifies the level of interest in one or more objects observed by the second user within the location clusters and assigns the values to the one or more objects of the location clusters based on the sharable profile. Using the sharable profile of the second user, predictions can be made for one or more objects within the physical environment being observed by the first user, identifying objects having a level of interest for the second user below a threshold level for the location cluster corresponding to the current location. Selective replacement of one or more objects can be performed for those objects with a level of interest for the second user that is below the threshold level and replacing the objects with a rendered image of a replacement object that has the level of interest for the second user above a threshold level for the location cluster. Replacement objects having the level of interest for the second user that is above the threshold level for the location cluster are displayed by the AR viewing device being operated by the first user.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
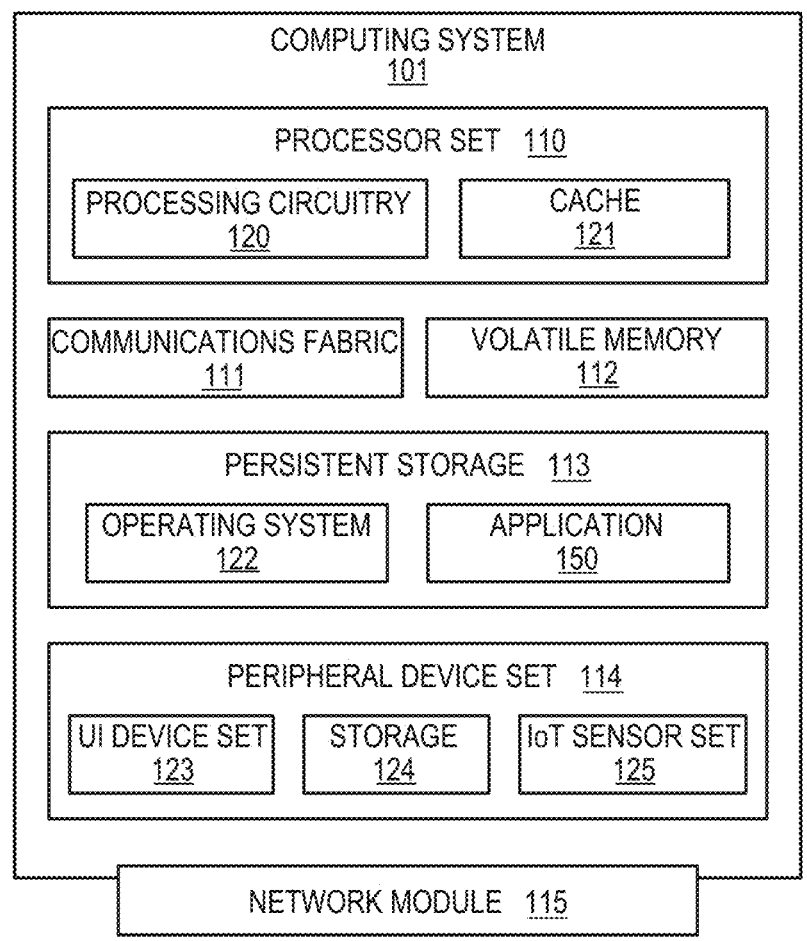
FIG. 1 depicts a block diagram illustrating an embodiment of a computer system and the components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

The use of AR devices is becoming more mainstream with end users. AR devices offer a powerful tool for personalizing the exploration of a user's surroundings and customizing commercial opportunities toward known user preferences. AR display devices allow for users to experience a customizable composite view of both physical reality and virtual reality by rendering computer-generated graphics over a portion of the user's surrounding physical environment being captured by cameras onboard the AR display device or other IoT devices. Approaches of the present disclosure recognize that a user's preference for viewing different AR objects within an AR environment can not only change over time, but user preferences can also vary depending upon the different types of locations the user may be viewing and surrounding contexts the user may be experiencing while engaging with AR display devices. In other words, depending on the current location of the user and the classification or the type of location (a location cluster) the user is engaged with, the AR display device may selectively introduce different computer-generated objects that are known or discovered to be more interesting to the user within specific location clusters. Simultaneously obscuring or removing representations of physical objects within the AR environment which are identified as being uninteresting to the user by manipulating the representations of the uninteresting objects and/or overlaying the more interesting replacement objects over the top of the representations of the physical objects in the AR environment.

Embodiments of the present disclosure leverage the use of AI-enabled systems, AR devices and IoT systems to discover and learn user-specific preferences within various location clusters visited by a user and may then replace irrelevant or uninteresting objects being viewed while within the location clusters with objects that are more relevant or interesting to the user. The measure of whether an object is considered "interesting", "neutral", "uninteresting" or variations thereof, may be based on priorities derived from one or more data sources which can provide insight into user preferences (explicit or inferred), patterns of user behavior, location data, and/or other types of user data indicating user preferences that may be unique or specific to a location or context. Embodiments of the present disclosure may discover or learn user preferences using location data from purchase histories (such as order placements, delivery locations, etc.), publicly available data (such as social media) and/or IoT data collected from one or more IoT devices. Location history and corresponding user data used to discover and learn the user preferences may be fetched from a plurality of different data sources made accessible to the system by the user. For example, smart phones or other mobile devices may provide IoT data and communication data, while other sources of data can include calendar information, social media, user profiles, purchase histories, location data such as GPS and data from wearable devices such as watches and glasses.

Embodiments of the present disclosure may use the collected user data to create a knowledge corpus about the user's preferences by processing and analyzing the data collected and fetched from the plurality of data sources. Analysis of the collected data being inputted into the knowledge corpus can provide insight and detail regarding each user's interaction with their surrounding environment, mobility patterns, shopping patterns and/or shopping behaviors based on location and context. Product reviews submitted by users and purchase histories can provide insight into a user's preferences for certain product attributes, including (but not limited to) the preferred color, size, shape and price of previously purchased products the user has interacted with in the past.

Using the analyzed knowledge corpus data, embodiments of the present disclosure can identify and create a plurality of different location clusters for a user. Location clusters may indicate or describe categories of locations or specific types of locations where a user may exhibit particular preferences, behaviors or patterns that may differ from other locations the user may visit. For example, location clusters may correlate to the user's home and the homes of family, friends, and/or relatives, the user's office, shopping locations, vacation destinations, and even temporary situations such as a user's preferences or behaviors while waiting for other people to join them in an activity. Users may exhibit different preferences or habits while positioned within a location corresponding to the "home" cluster as opposed to a location corresponding to the "office" cluster.

For each location cluster, embodiments of the present disclosure may classify objects observed or interacted with by the user and derive priorities for objects based on known user preferences for objects and/or products with particular attributes. Objects or products (referred to interchangeably herein) can be placed into different classification groups or assigned a priority score. For example, objects can be classified into groups that are considered interesting, non-interesting, or neutral to the user, and/or other types of descriptive classification that may describe a user's level of interest (or lack thereof). In other embodiments, an overall score for the object can be assigned for each location cluster. For instance, a priority score on a scale of 0 to 5, 0 to 10, 0 to 20, 0 to 100, etc. Based on the classifications of historically observed or experienced objects and/or products, embodiments of the present disclosure can predict a level of engagement between the user and objects the user may interact with or view while using an AR display device. Predictions may be calculated that indicate a probability that a user will interact with and/or purchase an object presented within the AR environment based on known user interest levels, patterns of behaviors and the associated parameters of the object being displayed within a particular location cluster. Based on the predictions being made using historical data and location data, AR environments may be manipulated. Objects or products with low priority scores or classified as being uninteresting or irrelevant to the user while positioned within the current location cluster can be replaced with computer-generated replacement objects predicted to be considered more interesting to the user or more likely to be interacted with, based on known user preferences derived from the user data and location data. For instance, by selectively replacing uninteresting or low priority scoring objects within the AR environment with objects classified as highly interest or having the highest priority scores for the user. As a user's interest in various object parameters evolves over time and trends in the user's behavior change over time, for instance based on the user's activity data collected from one or more data sources (such as likes and dislikes), user preferences and probability predictions may be updated, resulting in prioritization of different types of objects being overlayed within the AR environment as user preferences change.

In some embodiments of the present disclosure, objects being visually being presented to the user while viewing the AR environment and predicted to be of interest to the user, may be selectable for purchase. Purchases of the presented replacement virtual objects being overlaid onto the AR environment may be possible through an interface of an AR display device or via a separate computing device such as a mobile device. Replacement objects being displayed within the AR environment may identify the source provider of the object. Within an AR interface, the user may select the identified replacement object and commence a purchasing transaction. A user may initiate payment for the item on-demand through the AR interface or by sending the purchase transaction over to another computing system, such as the nearby mobile device. Users may provide payment information and a shipping address to complete the payment transaction. Upon completion of the transaction, a physical version of the replacement object viewable through the AR device may be shipped to the address selected by the user.

Computing System

Various aspects of the present disclosure are described by narrative text, flowcharts, block diagrams of computer systems and/or block diagrams of the machine logic included in computer program product (CPP) embodiments. With respect to any flowcharts, the operations can be performed in a different order than what is shown in the flowchart. For example, two operations shown in successive flowchart blocks may be performed in reverse order, as a single integrated step, concurrently, or in a manner at least partially overlapping in time. A computer program product embodiment ("CPP embodiment") is a term used in the present disclosure that may describe any set of one or more storage media (or "mediums") collectively included in a set of one or more storage devices. The storage media may collectively include machine readable code corresponding to instructions and/or data for performing computer operations. A "storage device" may refer to any tangible hardware or device that can retain and store instructions for use by a computer processor. Without limitation, the computer readable storage medium may include an electronic storage medium, a magnetic storage medium, an optical storage medium, an electromagnetic storage medium, a semiconductor storage medium, a mechanical storage medium, and/or any combination thereof. Some known types of storage devices that include mediums referenced herein may include a diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination thereof.

A computer-readable storage medium should not be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As understood by those skilled in the art, data is typically moved at some occasional points in time during normal operations of a storage device, such as during access, de-fragmentation or garbage collection. However, such movement of the data during operations does not render the storage device as transitory because the data is not transitory while it is stored.

FIG. 1 illustrates a block diagram describing an embodiment of a computing system 101 operating within a computing environment. The computing system 101 may be a simplified example of a computing device (i.e., a physical bare metal system and/or a virtual system) capable of performing the computing operations described herein. Computing system 101 may be representative of the one or more computing systems or devices implemented in accordance with the embodiments of the present disclosure and further described below in detail. Computing system 101 as depicted in FIG. 1 (and FIG. 2) provides only an illustration of one implementation of a computing system 101 and does not imply any limitations regarding the environments in which different embodiments may be implemented. In general, the components illustrated in the computing system 101 may be representative of an electronic device, either physical or virtualized, that is capable of executing machine-readable program instructions.

Embodiments of computing system 101 may take the form of a desktop computer, laptop computer, tablet computer, smart phone, smart watch or other wearable computer such as a virtual reality headset, augmented reality headset, glasses or wearable accessory. Embodiments of the computing system 101 may also take the form of a mainframe computer, server, quantum computer, a non-conventional computer system such as an autonomous vehicle or home appliance, or any other form of computer or mobile device now known or to be developed in the future that is capable of running an application 150, accessing a network 102 or querying a database, such as remote database 130. Performance of a computer-implemented method executed by a computing system 101 may be distributed among multiple computers and/or between multiple locations. Computing system 101 may be located as part of a cloud network, even though it is not shown within a cloud in FIGS. 1-2. Moreover, computing system 101 is not required to be part of a cloud network except to any extent as may be affirmatively indicated.

Processor set 110 includes one, or more, computer processors of any type now known or to be developed in the future. Processing circuitry 120 may be distributed over multiple packages. For example, multiple, coordinated integrated circuit chips. Processing circuitry 120 may implement multiple processor threads and/or multiple processor cores. Cache 121 may refer to memory that is located on the processor chip package(s) and/or may be used for data or code that can be made available for rapid access by the threads or cores running on processor set 110. Cache 121 memories can be organized into multiple levels depending upon relative proximity to the processing circuitry 120. Alternatively, some, or all of cache 121 of processor set 110 may be located "off chip." In some computing environments, processor set 110 may be designed for working with qubits and performing quantum computing.

Figure 6:
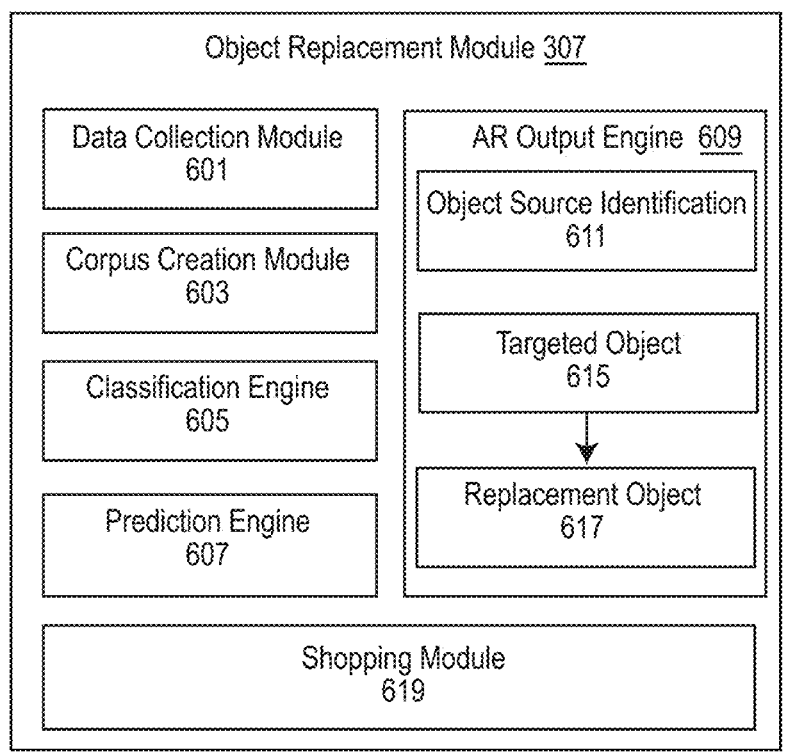
FIG. 6 depicts a functional block diagram describing an embodiment of an object replacement module providing object replacement features or functions to AR environments, in accordance with the present disclosure.

Computer readable program instructions can be loaded onto computing system 101 to cause a series of operational steps to be performed by processor set 110 of computing system 101 and thereby implement a computer-implemented method. Execution of the instructions can instantiate the methods specified in flowcharts and/or narrative descriptions of computer-implemented methods included in this specification (collectively referred to as "the inventive methods"). The computer readable program instructions can be stored in various types of computer readable storage media, such as cache 121 and the other storage media discussed herein. The program instructions, and associated data, can be accessed by processor set 110 to control and direct performance of the inventive methods. In computing environments of FIGS. 1-2, at least some of the instructions for performing the inventive methods may be stored in persistent storage 113, volatile memory 112, and/or cache 121, as application(s) 150 comprising one or more running processes, services, programs and installed components thereof. For example, program instructions, processes, services and installed components thereof may include object replacement module 307 comprising components such as data collection module 601, classification engine 605, prediction engine 607, AR output engine 609, shopping module 619, and sub-components thereof as shown in FIG. 6.

Communication fabric 111 may refer to signal conduction paths that may allow the various components of computing system 101 to communicate with each other. For example, communications fabric 111 can provide for electronic communication among the processor set 110, volatile memory 112, persistent storage 113, peripheral device set 114 and/or network module 115. Communication fabric 111 can be made of switches and electrically conductive paths that make up busses, bridges, physical input/output ports and the like. Other types of signal communication paths may be used, such as fiber optic communication paths and/or wireless communication paths.

Volatile memory 112 may refer to any type of volatile memory now known or to be developed in the future, and may be characterized by random access, but this is not required unless affirmatively indicated. Examples include dynamic type random access memory (RAM) or static type RAM. In computing system 101, the volatile memory 112 is located in a single package and can be internal to computing system 101, but, alternatively or additionally, the volatile memory 112 may be distributed over multiple packages and/or located externally with respect to computing system 101. Application 150, along with any program(s), processes, services, and installed components thereof, described herein, may be stored in volatile memory 112 and/or persistent storage 113 for execution and/or access by one or more of the respective processor sets 110 of the computing system 101.

Persistent storage 113 can be any form of non-volatile storage for computers that may be currently known or developed in the future. The non-volatility of this storage means that the stored data may be maintained regardless of whether power is being supplied to computing system 101 and/or directly to persistent storage 113. Persistent storage 113 may be a read only memory (ROM), however, at least a portion of the persistent storage 113 may allow writing of data, deletion of data and/or re-writing of data. Some forms of persistent storage 113 may include magnetic disks, solid-state storage devices, hard drives, flash-based memory, erasable read-only memories (EPROM) and semi-conductor storage devices. Operating system 122 may take several forms, such as various known proprietary operating systems or open-source Portable Operating System Interface type operating systems that employ a kernel.

Peripheral device set 114 includes one or more peripheral devices connected to computing system 101. For example, via an input/output (I/O) interface). Data communication connections between the peripheral devices and the other components of computing system 101 may be implemented using various methods. For example, through connections using Bluetooth, Near-Field Communication (NFC), wired connections or cables (such as universal serial bus (USB) type cables), insertion type connections (for example, secure digital (SD) card), connections made though local area communication networks and/or wide area networks such as the internet. In various embodiments, UI device set 123 may include components such as a display screen, speaker, microphone, wearable devices (such as glasses, googles, headsets, smart watches, clip-on, stick-on or other attachable devices), keyboard, mouse, printer, touchpad, game controllers, and haptic feedback devices. Storage 124 can include external storage, such as an external hard drive, or insertable storage, such as an SD card. Storage 124 may be persistent and/or volatile. In some embodiments, storage 124 may take the form of a quantum computing storage device for storing data in the form of qubits. In some embodiments, networks of computing systems 101 may utilize clustered computing and/or utilize storage components as a single pool of seamless resources when accessed through a network by one or more computing systems 101. For example, a storage area network (SAN) that is shared by multiple, geographically distributed computer systems 101 or network-attached storage (NAS) applications. IoT sensor set 125 can be made up of sensors that can be used in Internet-of-Things applications. For example, a sensor may be a temperature sensor, motion sensor, light sensor, infrared sensor or any other type of known sensor type.

Network module 115 may include a collection of computer software, hardware, and/or firmware that allows computing system 101 to communicate with other computer systems through a computer network 102, such as a LAN or WAN. Network module 115 may include hardware, such as modems or Wi-Fi signal transceivers, software for packetizing and/or de-packetizing data for communication network transmission, and/or web browser software for communicating data over the network. In some embodiments, network control functions and network forwarding functions of network module 115 are performed on the same physical hardware device. In other embodiments (for example, embodiments that utilize software-defined networking (SDN)), the control functions and the forwarding functions of network module 115 can be performed on physically separate devices, such that the control functions manage several different network hardware devices. Computer readable program instructions for performing the inventive methods can typically be downloaded to computing system 101 from an external computer or external storage device through a network adapter card or network interface included in network module 115.

Figure 2:
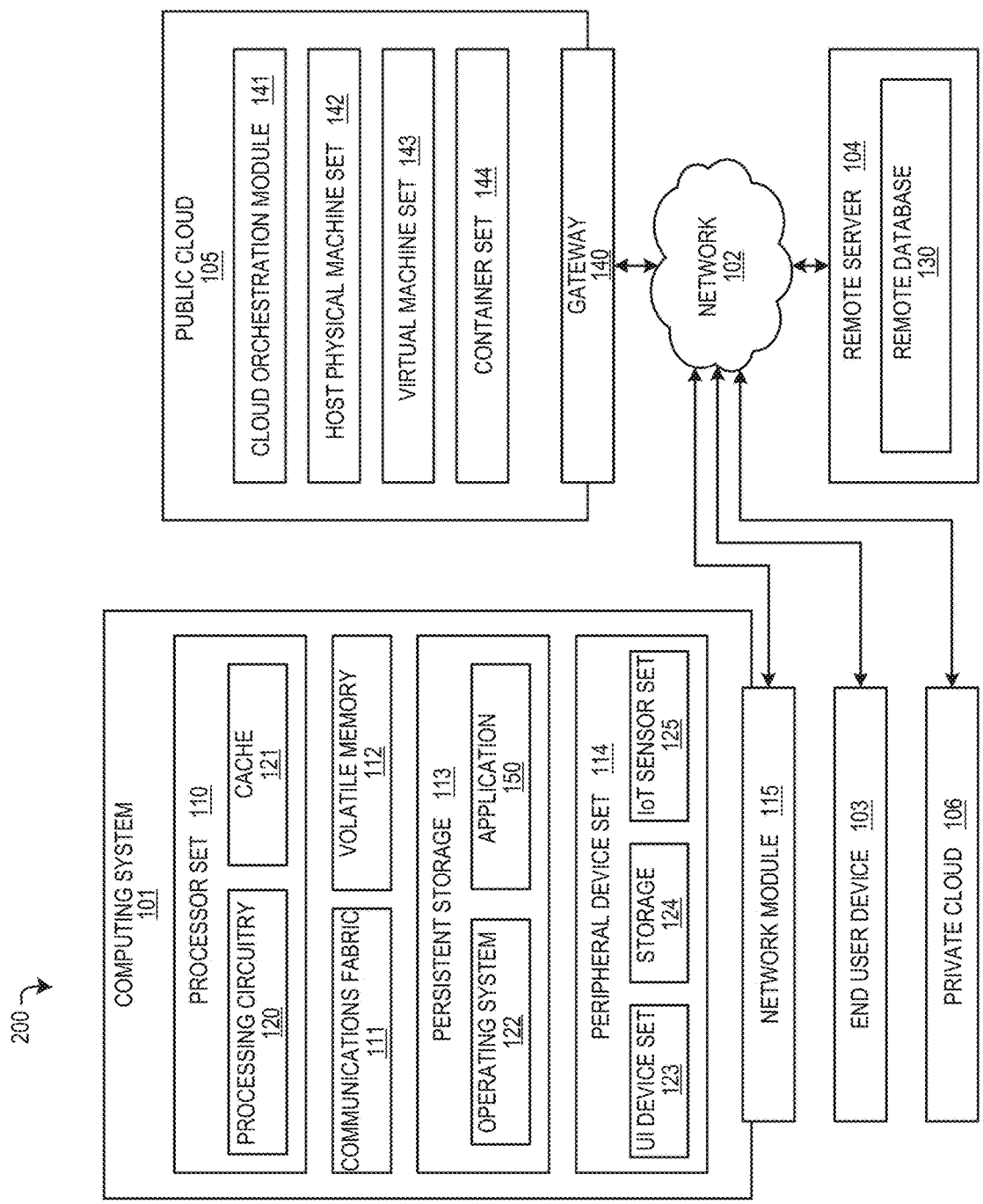
FIG. 2 depicts a block diagram illustrating an extension of the computing system environment of FIG. 1, wherein the computer systems are configured to operate in a network environment (including a cloud environment), and perform methods described herein in accordance with the present disclosure.

FIG. 2 depicts a computing environment 200 which may be an extension of the computing environment 100 of FIG. 1, operating as part of a network. In addition to computing system 101, computing environment 200 can include a computing network 102 such as a wide area network (WAN) (or another type of computer network) connecting computing system 101 to one or more end user device (EUD) 103, remote server 104, public cloud 105, and/or private cloud 106. In this embodiment, computing system 101 includes processor set 110 (including processing circuitry 120 and cache 121), communication fabric 111, volatile memory 112, persistent storage 113 (including operating system 122 and application(s) 150, as identified above), peripheral device set 114 (including user interface (UI) device set 123, storage 124, Internet of Things (IoT) sensor set 125), and network module 115. Remote server 104 includes remote database 130. Public cloud 105 includes gateway 140, cloud orchestration module 141, host physical machine set 142, virtual machine set 143, and/or container set 144.

Network 102 may be comprised of wired or wireless connections. For example, connections may be comprised of computer hardware such as copper transmission cables, optical transmission fibers, wireless transmission, routers, firewalls, switches, gateway computers and/or edge servers. Network 102 may be described as any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. Other types of networks that can be used to interconnect the various computer systems 101, end user devices 103, remote servers 104, private cloud 106 and/or public cloud 105 may include Wireless Local Area Networks (WLANs), home area network (HAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 101.

End user device 103 can include any computer device that can be used and/or controlled by an end user (for example, a customer of an enterprise that operates computing system 101) and may take any of the forms discussed above in connection with computing system 101. EUD 103 may receive helpful and useful data from the operations of computing system 101. For example, in a hypothetical case where computing system 101 is designed to provide a recommendation to an end user, this recommendation may be communicated from network module 115 of computing system 101 through network 102 to EUD 103. In this example, EUD 103 can display, or otherwise present, the recommendation to an end user. In some embodiments, EUD 103 may be a client device, such as thin client, thick client, mobile computing device such as a smart phone, mainframe computer, desktop computer and so on.

Remote server 104 may be any computing systems that serves at least some data and/or functionality to computing system 101. Remote server 104 may be controlled and used by the same entity that operates computing system 101. Remote server 104 represents the machine(s) that collect and store helpful and useful data for use by other computers, such as computing system 101. For example, in a hypothetical case where computing system 101 is designed and programmed to provide a recommendation based on historical data, the historical data may be provided to computing system 101 from remote database 130 of remote server 104.

Public cloud 105 may be any computing systems available for use by multiple entities that provide on-demand availability of computer system resources and/or other computer capabilities including data storage (cloud storage) and computing power, without direct active management by the user. The direct and active management of the computing resources of public cloud 105 can be performed by the computer hardware and/or software of cloud orchestration module 141. The computing resources provided by public cloud 105 can be implemented by virtual computing environments that run on various computers making up the computers of host physical machine set 142, and/or the universe of physical computers in and/or available to public cloud 105. The virtual computing environments (VCEs) may take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through network 102.

VCEs can be stored as "images." A new active instance of the VCE can be instantiated from the image. Two types of VCEs may include virtual machines and containers. A container is a VCE that uses operating-system-level virtualization, in which the kernel allows the existence of multiple isolated user-space instances, called containers. These isolated user-space instances may behave as physical computers from the point of view of applications 150 running in them. An application 150 running on an operating system 122 can utilize all resources of that computer, such as connected devices, files and folders, network shares, CPU power, and quantifiable hardware capabilities. Applications 150 running inside a container of container set 144 may only use the contents of the container and devices assigned to the container, a feature which may be referred to as containerization.

Private cloud 106 may be similar to public cloud 105, except that the computing resources may only be available for use by a single enterprise. While private cloud 106 is depicted as being in communication with network 102 (such as the Internet), in other embodiments a private cloud 106 may be disconnected from the internet entirely and only accessible through a local/private network. A hybrid cloud may refer to a composition of multiple clouds of different types (for example, private, community or public cloud types), and the plurality of clouds may be implemented or operated by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 may be both part of a larger hybrid cloud environment.

System for Selectively Replacing Objects in an Augmented Reality Environment Based on Location Cluster It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 3:
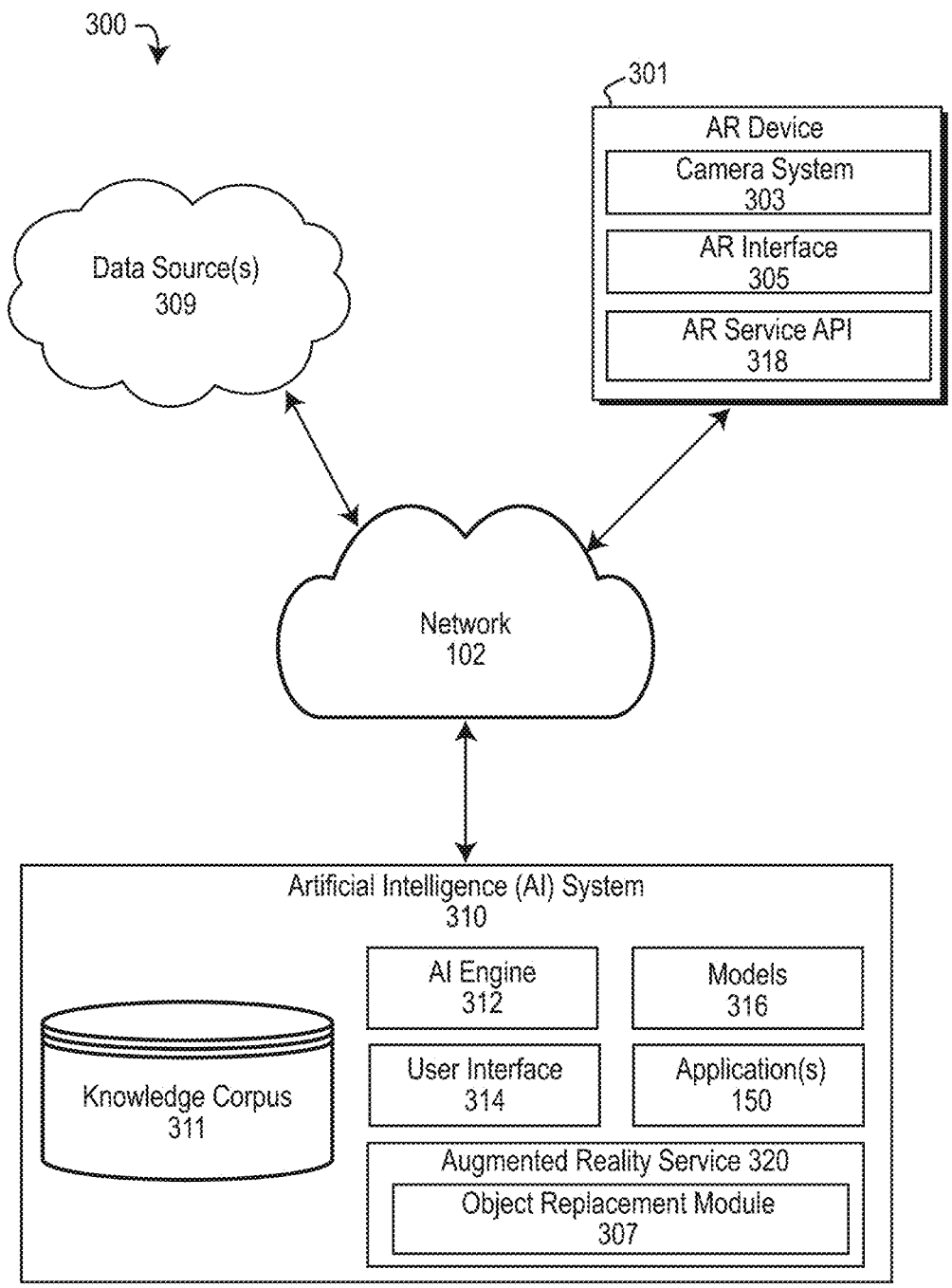
FIG. 3 depicts a functional block diagram describing an embodiment of a system for selectively overlying representations of physical objects within an augmented reality environment with computer-generated replacement objects based on known user preferences within a location cluster, in accordance with the present disclosure.

Referring to the drawings, FIG. 3 depicts an embodiment of a computing environment 300 illustrating a system capable of selectively replacing target objects displayed by an AR interface 305 of an augmented reality (AR) device 301. Selective replacement of the objects being displayed can be based on user preferences and predictions of user interests in the replacement objects or the likelihood of interactivity with the replacement objects for a particular location cluster compared with the predicted level of interest or likelihood of interactivity with the target object within the location cluster. As shown in FIG. 3, embodiments of the computing environment 300 can include one or more data source(s) 309, at least one AR device 301 and/or an artificial intelligence (AI) system 310, placed in communication with one another via a network 102.

An AR device 301 may refer to a computing system 101 capable of viewing an augmented reality environment comprising a composite of both representations of real physical objects positioned within a user's surrounding environment and computer-generated artifacts including computer-generated visuals, animations, video, images, auditory sounds or other sensory information; enhancing the user's experience of the real world by viewing the composite environment being rendered or displayed by the AR device 301. Examples of an AR device 301 may include (but not limited to) headsets, glasses, contact lenses or other types of head-mounted displays, mobile phones, tablets or other mobile computing devices, etc. In addition to the components of a computing system 101 (as explained above), which may be part of an AR device 301, embodiments of the AR device 301 may include additional components such as a camera system 303, and an AR interface 305. Embodiments of a camera system 303 may include one or more types of camera devices, sensors, and/or IoT devices, processing components, projectors, and/or reflectors. Camera devices of the camera system 303 can take three-dimensional images or video of real-world objects and environments. The 3D images and videos captured by the camera devices can be processed by one or more processing components. Sensors can collect data about the user's interaction with AR software, and the virtual objects being displayed by the AR device 301, then send those interactions to one or more processing components for additional processing. Processing components of the camera system 303 can include GPUs, CPUs, memory, Bluetooth, Wi-Fi, GPS, or other components to capable of processing the 3D images taken by the camera and signals from the sensors. Processing components of the camera system 303 can measure speed, angle, orientation, direction, etc. In some embodiments, a miniature projector of the AR device's 301 camera system 303 may project generated graphics and simulations of the AR environment onto lenses or other surfaces of the AR device 301 acting as a display.

Augmented reality (AR) interface 305 allows the user to navigate through the functions or features of augmented reality programs, applications, services or other types of software capable of generating the graphics, visuals and other elements of the AR environment displayed or outputted by the AR device 301. Users can input commands or interact with the software of the AR device 301 via the AR interface 305. For example, a user operating an AR device 301 may change settings, select configurations, interact with objects being displayed, provide feedback, direct the output of the AR device 301 and/or initiate purchase transaction for the replacement objects being displayed by the AR interface 305. In some embodiments, the AR interface 305 can be part of a heads-up display (HUD) projecting AR environment data to a transparent display device that is viewable by the user.

Embodiments of an AR device 301 may create AR environments using methods such as Simultaneous Localization and Mapping (SLAM) and/or depth tracking technology to capture images of the surrounding environment and calculate distances to objects using sensor data and other technologies onboard the AR device 301. SLAM technology may refer to a set of algorithms that may solve a simultaneous localization and mapping problems using a plurality of feature points to help the user understand the surrounding physical world, allowing apps to understand 3D objects and scenes. The surrounding environment may be detected by the camera system 303 of the AR device 301, one or more sensors onboard the AR device 301, onboard IoT devices or nearby IoT infrastructure, and/or location-based technologies such as GPS, accelerometers, digital compasses, velocity meters, etc. SLAM technology can use the input from camera system 303, IoT devices and infrastructure, sensors, etc. to detect the surrounding environment and create a virtual map of the environment. The AR device 301 can trace its position, direction and path on the virtual map, while feature detection is done using the camera system 303 and sensors to collect the feature points from various viewpoints. Triangulation techniques can be used to infer three-dimensional locations of objects and their position relative to the visuals being produced by the AR camera system 303.

In addition to, or alongside, a SLAM-based approach for generating and displaying computer-generated objects within an AR environment, AR device 301 can produce AR environments using additional methods such as a recognition-based AR, a location-based approach, depth tracking and/or natural feature tracking. Recognition-based AR may be implemented by the AR device 301 using the camera system 303 to identify one or more markers, such as a real-world object. An overlay is possible where a marker is detected by the camera system 303, and the AR device 301 can calculate the position and orientation of the marker to replace the real-world marker (i.e., the real object) with a 3-D marker (i.e., a computer-generated replacement object). AR device 301 can calculate position and orientation of the marker, whereby rotating the marker rotates the entire object. A location-based approach for generating AR environments may use simulations and visualizations that may be generated from data collected by GPS, digital compasses, and/or accelerometers. A depth tracking approach may us a depth tracking camera system 303 to generate a real-time depth map to calculate real-time distances of objects within the tracking area of the camera system's 303 camera, isolate the object from the general depth map and analyze it.

Embodiments of AR device 301 may include an application programming interface (API) for one or more augmented reality applications or services that may be available to the AR device 301 via network 102. For example, as shown in FIG. 3, AR service API 318 may facilitate communication between the AR device 301 and AI system 310 in order to gain access to one or more augmented reality service 320 or other application(s) 150 hosted by the AI system 310. Embodiments of AR service API 318 may enable two or more software components to communicate with one another over network 102 using a set of definitions and protocols. For example, the AR service API 318 may be a Simple Object Access Protocol (SOAP) API, Remote Procedure Call (RPC) API, WebSocket API, or REST API. Architecture of the AR service API 318 may be a client and service architecture, wherein the application sending the requests through the AR device 301 is the client and the AI system 310 providing responses may be considered the server.

Using the established protocols and definitions, augmented reality applications on the AR device 301 can "talk" to AI system 310 via the AR service API 318, in order to receive augmented reality content provided by an augmented reality service 320 (or other AR applications). Features and functions of the augmented reality service 320 being provided to the AR device 301 can include object replacement based on location and preferences of a user (as described in detail throughout this disclosure). Object replacement features and functions can be offered directly by the augmented reality service 320 and/or one or more modules or plugins to the augmented reality service 320. The term "module" may refer to a hardware module, software module, or a module may be a combination of hardware and software resources. A module (whether hardware, software or a combination thereof) may be designed to implement or execute one or more specific tasks, routines and/or functions. Embodiments of hardware-based modules may include self-contained components such as chipsets, specialized circuitry, processor sets 110, one or more volatile memory 112 devices and/or persistent storage 113. A software-based module may be part of an application 150, program code or linked to program code comprising a set of specific programmed instructions loaded into a volatile memory 112 or persistent storage 113.

Figure 4:
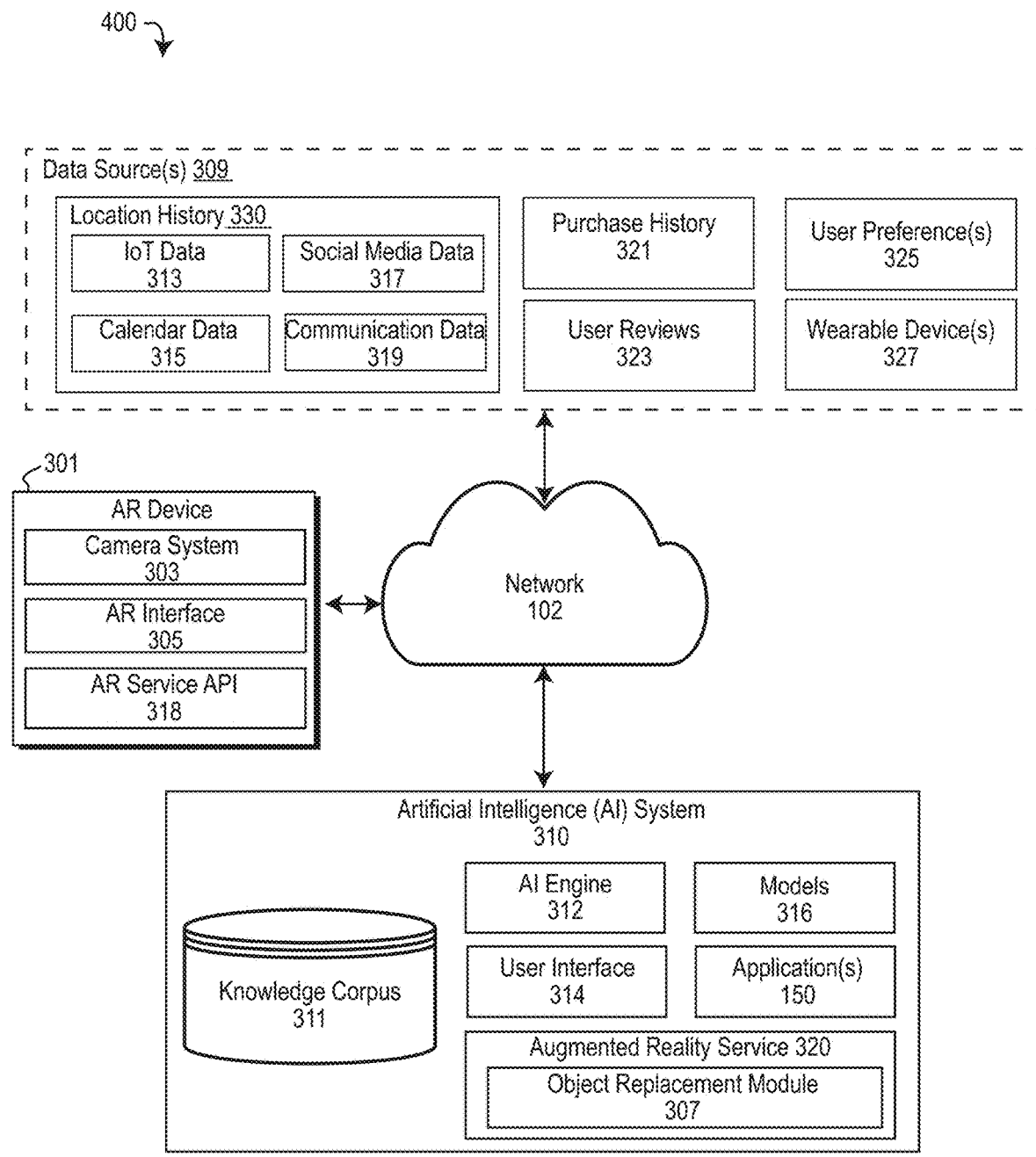
FIG. 4 illustrates an exemplary embodiment of the system from FIG. 3 depicting examples of one or more data sources that may be used for selectively overlaying representations of physical objects within an augmented reality environment with computer-generated replacement objects based on the user preferences corresponding to the location cluster, in accordance with the present disclosure.
Figure 5:
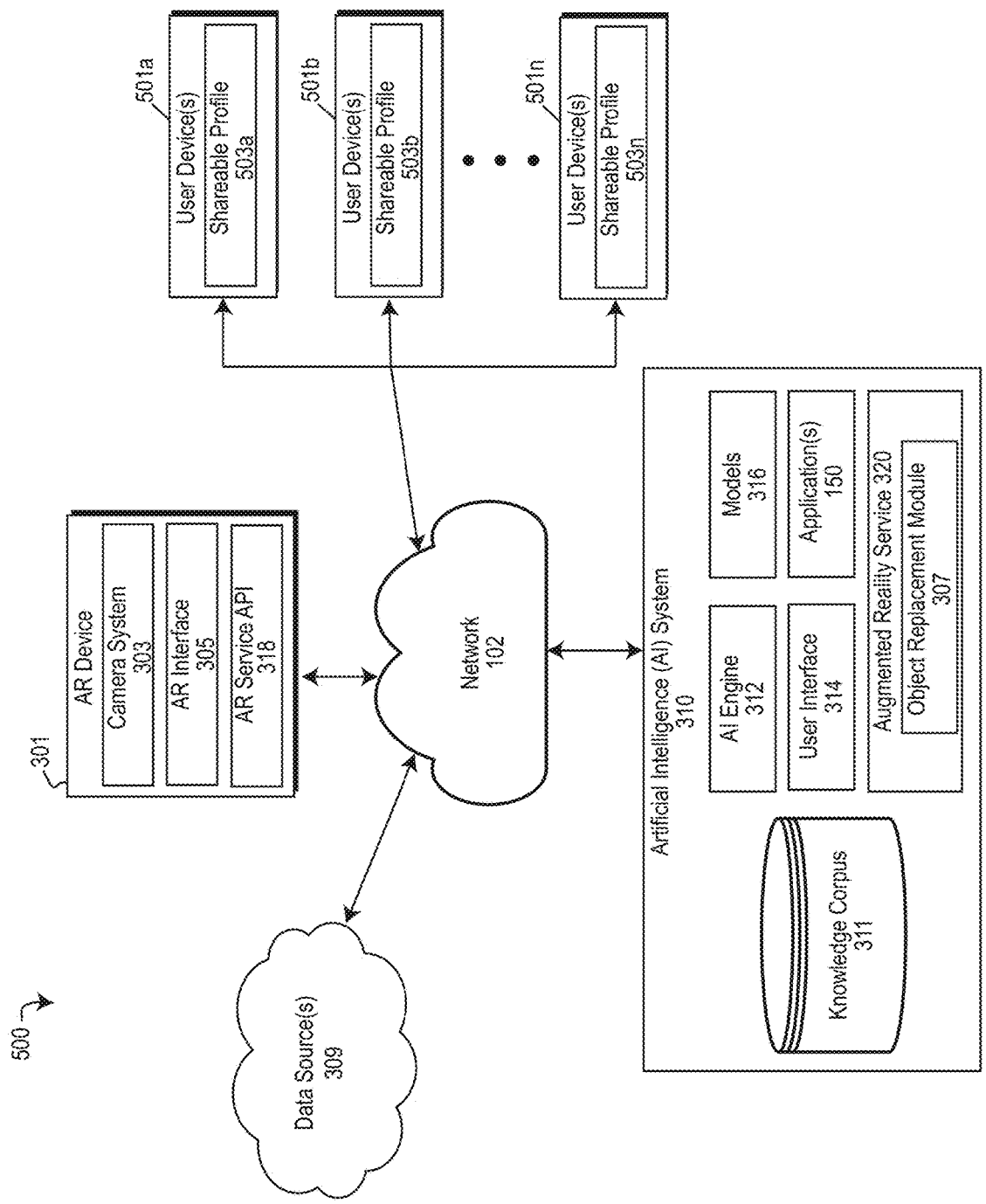
FIG. 5 depicts a functional block diagram of an alternative embodiment of a computing environment for selectively overlaying representations of physical objects within an augmented reality environment with computer-generated replacement objects based on known user preferences within a location cluster for a third-party user providing user preference data via a sharable profile, in accordance with the present disclosure.

An artificial intelligence (AI) system 310 is depicted in FIGS. 3-5. The AI system 310 is shown to be connected to network 102. The AI system 310 may be readily accessible by AR device 301 and may be capable of accessing one or more data source(s) 309 connected to network 102. Embodiments of AI system 310 may maintain a knowledge corpus 311 (also known as a "knowledge base"). The knowledge corpus 311 may be a store of information or data that the AI system 310 can draw on to solve problems and find solutions. For example, solving problems and finding solutions for the augmented reality service 320 with regards to the identification of user preferences for objects having particular attributes, classifications of user-interests in particular objects depending on a corresponding location cluster and predicting of whether a user may interact with a particular object based on past behaviors and preferences of the user. The knowledge corpus 311 can include an underlying set of facts, ground truths, assumptions, models, derived data and rules upon which AI system 310 has available in order to solve the problem of deciding which objects within an AR environment to replace, and the replacement object to display to the user instead, within the AR environment.

Knowledge corpus 311 and records thereof, can be created by inputting content directly into the knowledge corpus 311 by user or administrator in some embodiments. In other embodiments or instances, creation of the knowledge corpus 311 and records thereof, may occur by ingesting content provided by one or more data sources 309. The content being ingested by the knowledge corpus 311 may be in the form of any type of file, text, article or other source of data (structured or unstructured) for use within the AI system 310. The corpus of content may be provided in the form of electronic documents, files and/or multimedia, and may be accessed by the AI system 310 via a network connection or internet connection to network 102. AI system 310 may fetch data for creating and/or updating the knowledge corpus 311 from one or more of the data source(s) 309 being inputted into AI system 310 and the data can be routed through the network 102. Embodiments of AI system 310 may operate in environments of any size, including local and global (e.g., the Internet). Additionally, AI system 310 can serve as a front-end system that can make available a variety of knowledge extracted from, or represented in documents, network-accessible sources and/or structured data sources, to one or more applications 150 or programs, such as an augmented reality service 320. In this manner, some processes populating the AI system 310 may also include input interfaces to receive output from the knowledge corpus 311 and respond accordingly.

The data source(s) 309 feeding into knowledge corpus 311 may include computing systems, devices, databases and/or other repositories of data which may contain location history of a user and data providing insights into user interests. For example, AI system 310 may derive location history 330 of a user based on one or more different data sources 309 collecting and sharing IoT data 313, calendar data 315, social media data 317, and communication data 319 from end user devices such as mobile phones, tablets, AR device 301, IoT devices such as wearable devices 327 including watches, glasses, etc. Moreover, knowledge corpus 311 can ingest data inferring user interests and preferences (in addition to being told explicitly by a user) from plurality of available data sources 309. For instance, as shown in FIG. 4, data sources 309 being ingested by the AI system 310 into knowledge corpus 311 that might indicate user preferences, may include data describing a user's purchase history 321, user reviews 323, user preference(s) 325, and/or integrated wearable device 327 data. Moreover, in addition to providing location history 330 of a user, IoT data 313, social media data 317 and location data (such as GPS information) can also provide insight into user preferences (either alone or in combination with other data sources 309). For instance, a combination of ingested data sources 309 providing location history 330 and purchase history 321 can provide insight into purchase locations, order placement locations, and delivery locations used by a user.

Embodiments of AI system 310 may include an AI engine 312. The AI engine 312 may be an interconnected and streamlined collection of operations. Information being inputted into AI system 310 may work its way through a machine learning system (i.e., from data collection to model training). During data collection (such as ingestion of data from the plurality of data sources 309) data can be transported from multiple data sources 309 and into a centralized database stored in knowledge corpus 311. From the knowledge corpus 311, AI engine 312 can access, analyze and use the data stored by the knowledge corpus 311. For example, AI engine 312 can analyze the data collected from the data sources 309 with respect to each user's interactions with their surroundings, each user's mobility patterns, shopping patterns of each user and resulting behaviors based on those shopping patterns, attributes of products and objects purchased or of interest to the user including, but not limited to the color, shape, size, price, etc., as well as sentiment and natural language processing of product reviews and other types of written feedback created by each user.

Models 316 may be the output and result of AI modeling using the data collected from the one or more data sources 309. AI modeling may refer to the creation, training and deployment of machine learning algorithms that may emulate decision-making based on data available within the knowledge corpus 311 of the AI system 310 and/or using data that may be available outside of the knowledge corpus 311. The AI models 316 may provide the AI system 310 with a foundation to support advanced intelligence methodologies, such as real-time analytics, predictive analytics and/or augmented analytics, which can be utilized when identifying location clusters for each user, user preferences for objects while within a particular location cluster and predicted behaviors of users towards various products or objects presented to a user within an AR environment.

User interface 314 may refer to an interface provided between AI system 310 and human users. For example, end users operating an AR device 301 can experience an AR environment provided by augmented reality service 320. The user interface 314 utilized by AI system 310 may be a command line interface (CLI), menu-driven interface, graphical user interface (GUI), a touchscreen GUI, etc. Programs and applications 150 provided by AI system 310, such as the augmented reality service 320, may include any type of application that may incorporate and leverage the use of artificial intelligence to complete one or more tasks, operations or provide an environment to a user. Examples of different types of applications that may leverage the AI capabilities of the AI system 310 and can include search engines, recommendation systems, virtual assistants, language translators, facial recognition, image labeling systems, question-answering systems, augmented reality services 320 and combinations of applications thereof.

Augmented reality service 320 may provide users of an AR device 301 with an augmented reality environment which can be viewed through the AR interface 305, including computer-generated graphics, visuals, sounds or other virtual components and artifacts that can be rendered and displayed by the AR device 301. Augmented reality services 320 providing an augmented reality environment to an AR device 301 may, in some embodiments, natively include object replacement features, functions and capabilities as described throughout this disclosure. Features or functions can include but not limited to selective replacement of one or more objects of an AR environment that are predicted to be uninteresting to a user based on a location cluster, and a replacing the object with another object predicted to be more interesting and more likely to be interacted with and/or purchased by a user if presented to the user within an AR environment. Such an embodiment whereby the augmented reality service 320 include integrated functions, features and/or components of object replacement module 307 are depicted in FIGS. 3-5 In other embodiments, the augmented reality service 302 may include a separate plugin or API, which may add object replacement features, functions and capabilities to an existing, standalone, augmented reality applications.

In the embodiment of computing environments 300, 400, 500, the functions and features for replacing objects within the AR environment with one or more replacement objects predicted to be interesting to the user, may be represented by object replacement module 307. Although object replacement module 307 may be part of the augmented reality service 320 and/or AI system 310 in the embodiments depicted by the drawings, the components, features and functions of object replacement module 307 as shown in FIG. 6 and discussed herein, may be entirely present within augmented reality service 320, one or more applications 150, AI system 310 or other computing systems connected to network 102, including as locally available components onboard AR device 301 in some embodiments. In other embodiments, the components and features of object replacement module 307 may be dispersed among a plurality of different computing systems and environments, including one or more AI system 310, AR device 301, one or more applications 150 or augmented reality services 320.

Referring to the drawings of FIG. 6, embodiments of an object replacement module 307 may include a plurality of different components, modules, and/or submodules. Each component or module of the object replacement module 307 may perform one or more processes, functions or tasks of an augmented reality service 320 or application directed toward customizing the AR interface 305 of an AR device 301 based on the user's preferences and locations and selectively replacing objects within the AR environment with replacement objects that are predicted to have higher levels of interest to the user. As shown in FIG. 6, object replacement module 307 may comprise components such as a data collection module 601, corpus creation module 603, classification engine 605, prediction engine 607, AR output engine 609 and/or shopping module 619.

Embodiments of data collection module 601 may perform tasks, functions and/or processes of the object replacement module 307 that are directed toward collecting and/or processing location data, user preferences, purchase histories and other information about users opting into augmented reality services 320 and usage policy of the object replacement module 307. Data collection module 601 may direct the AI system 310 toward one or more data sources 309 associated with each user and instruct the AI system 310 to commence with fetching the user data, location history, preferences and other information about the user from data sources 309, in an effort to discover and derive preferences based on location history 330 for each user of the augmented reality service 320. In some embodiments, a user may provide the data collection module 601 with permissions to access different types of data sources 309 and may deny access to other types of data sources 309. Accordingly, data collection module 601 may coordinate the fetching of data by the AI system 310 from data sources 309 that the user has granted permission to access and collect the user data such as location history, IoT data, calendar information, social media info, communication data, as well as any user profiles, purchase history, data integrated from wearable devices.

Embodiments of corpus creation module 603 may perform tasks, functions and/or processes of the object replacement module 307 that may be directed toward creating or updating user records within the knowledge corpus 311 based on the data collected from the one or more data sources 309. The corpus creation module 603 may further direct the AI system 310 to analyze the incoming data collected about the users from the data sources 309 and input the analysis into the knowledge corpus 311. For example, the corpus creation module 603 instructs the AI system 310 to conduct an analysis of the data collected about specific users with respect to identifying specific patterns about the user, including each user's interactions with their surroundings, mobility patterns, product reviews including sentiment analysis about the products, shopping patterns or behaviors based on user preferences. Moreover, analysis of the collected data may identify attributes associated with objects or products that may have been purchased or interacted with by the user, including product shape, size, color and prices. During analysis of the collected data about the user, the corpus creation module 603 can load information about the objects and products purchased or interacted with by the user into the records of the knowledge corpus 311. Information about objects loaded into the knowledge corpus 311 by the corpus creation module 603 may be referenced during the classification of objects and/or during graphical rendering of an object within an AR environment as a replacement object having a high level of predicted interest.

Embodiments of classification engine 605 may perform tasks, functions and processes of the object replacement module 307 directed toward identification and creation of one or more location clusters for each user and the classification of objects in accordance with the perceived level of interest of each user. Classification engine 605 leverages the analyzed data entered into the records of knowledge corpus 311 for each user to identify location clusters that may be relevant to the user, whereby changes in location may reflect different preferences or behaviors for interacting with and/or purchasing different types of products and objects. Location clusters may vary from user to user and can be identified from the data corresponding to a specific location or a grouping of locations that might be categorized together as a location cluster. For example, location clusters could be identified as a user's home, homes of friends, family or other relatives, the office, shopping locations (such as stores or restaurants), vacation or travel destinations and combinations thereof. In other instances, the location cluster may be identified as a specific context a user may experience. For instance, in a situation where a user is out in public waiting to meet with another person, or in their home waiting for a person to arrive. In both situations, a user may have different preferences while viewing an AR environment and waiting, thus two different location clusters may be identified.

Locations that might fall into the same location clusters for some users when identified more broadly, may be separately categorized into different location clusters for other users. For example, for some users, different patterns of preferences may be identified while a user is on vacation or traveling away from home and therefore the classification engine 605 may simply identify a "vacation" location cluster. However other users may exhibit different behaviors and preferences depending on the type of vacation destination, and therefore instead of having a "vacation" location cluster identified, the location cluster may be further differentiated to describe specific features or attributes of a vacation destination. For instance, identifying clusters as being vacation destinations "near the sea", "near the mountains", "camping in the woods", "international", "domestic", etc. In other embodiments, location clusters may be identified, and created based on other factors and contexts. For example, if a user was out shopping and there are known budgetary constraints, timing, travel itinerary requirements or other current requirements. Such different contexts and constraints may result in different classifications of location clusters that can be identified when considering different user preferences from the collected user data.

For each location cluster of each user, classification engine 605 may classify one or more objects or products previously observed by users into two or more different categories of interest using one or more classification algorithms. Classification algorithms may classify objects based on the user's history of preferences and actions for the type of object being observed within a particular location cluster as analyzed using the collected user and location data. For instance, based on objects previously observed by the user within an identified location cluster, the objects can be classified and labeled as being "interesting" (e.g., a value of 1) or "uninteresting" (e.g., a value of 0) to the user based on the user preferences. In some embodiments, a ratings scale may be used instead of a binary classification. For example, classification engine 605 may classify objects on a scale of 0 to 5, whereby 0 represents the use has exhibited zero interest in the object or product. A value of 3 may indicate the object is classified as being of "neutral" interest to the user, while a value of 5 may represent a user is considered to be "very interested" in the object or product. Classifications of objects and products can be saved or stored by the object replacement module 307 and/or the AI system 310. Classifications of objects being stored may be referenced in future situations while making one or more predictions about which objects to replace while viewing an AR environment within a particular location cluster, and the types of replacement objects to overlay the object with.

Prediction engine 607 may be responsible for executing one or more tasks, functions or processes of the object replacement module 307 directed toward predicting a level of engagement between a user and one or more objects and/or products observed by the user while operating an AR device 301 within a particular location cluster. Observations of objects and products observed by the user can be collected via the camera system 303 and may be provided to the object replacement module 307. Based on the identification of the object or products viewable within the AR environment, and the associated parameters of the objects or products captured visually by the camera system 303, the user's known preferences for the objects or products having similar or the same attributes as the observed objects, the prediction engine 607 can generate a prediction of whether or not a user may purchase or engage with the objects or products being displayed within the AR environment (depending on the location cluster). As the user's preferences for certain object or product attributes change over time based on current trends, likes, dislikes and other user data indicating the user's level of interest, the predictions provided by the prediction engine 607 may change over time. For the current location cluster that the user is presently within, prediction engine 607 can derive one or more target objects 615 to replace within the AR environment. An object or product captured by the camera system 303 can be identified as a target object 615 for replacement within the AR environment, if the predicted level of interest, engagement and/or likelihood of purchase by the user is below a threshold level.

Using the classification of known objects provided by classification engine 605, indicating which objects or product a user is interested in within a current location cluster, prediction engine 607 can derive or prioritize one or more replacement objects 617 having a level of interest by the user within the current location that is above a threshold level for the location cluster and replace the target object 615 within the AR environment. For example, when a user is ordering food from a vacation spot or the office, the user does not order spicy food, however, when the user is ordering food from home, the user does order spicy food. For the vacation or office location cluster, the classification engine 605 may classify spicy food as uninteresting to the user and thus replace spicy foods from a spicy food shop with sweets belonging to a nearby café offering desserts. Likewise, when the user is viewing a menu containing spicy foods at the location cluster "home", the spicy food objects may have a higher priority and thus be rated as interesting or neutral to the user and thus not replaced with another object while viewing the menu via the AR device 301.

Since the classifications and predictions are user specific for location clusters, based on user preferences, then different users may have experience different object replacements in the AR environment, even if they are visiting the same shops or locations. For example, if a first user doesn't like exploring local food within a vacation spot and does like the sport cricket, whereas a second user enjoys experiencing local cuisine but does not enjoy the sport cricket, when both the first user and second user visit the same street as part of vacation in London, the first user observing the street via the AR device 301 may observe that object belonging to a local food restaurant is replaced with an object belonging to Cricket Souvenir shop which is further down the street from the restaurant, whereas, the second user observing the same street may observe that the object belonging to the Cricket Souvenir shop is replaced with an object belonging to another local food shop positioned on the next street over.

In some embodiments, the prediction engine 607 may be tasked with predicting interest levels of a second user instead of a primary user viewing the target object 615 and select a replacement object 617 based on the preferences and/or interests of the second user for the location cluster corresponding to the first user's current location. For example, in a situation where the first user may be buying a gift for the second user. The second user may be able to share a sharable profile 503a-503n (referred to generally herein as "shareable profile 503") as shown by the computing environment 500 of FIG. 5. Instead of making predictions about target objects 615 for the user themselves, the AI system 310 can import a shareable profile 503 corresponding to another user of a user device 501a-501n and therefore make predictions about interest in objects and products corresponding to the second user using preferences and interests expressed via the imported shareable profile imported. The object replacement module 307 can then selectively replace objects within the AR interface 305 based on the second user's preferences for the current location cluster, instead of the user of the AR device 301. This may allow the current user of the AR device 301 to view replacement objects 617 known to be preferred by the second user that provided the shareable profile 503. Thus, the user of the AR device 301 may be able to view and shop for products of interest to the second user within the location cluster, instead of viewing replacement objects 617 that correspond to their own preferences for the location cluster. For instance, allowing the user of the AR device 301 to shop for products on behalf of the users sharing their shareable profile 503.

In some embodiments of the prediction engine 607, the prediction engine 607 may employ the use of a recurrent neural network (RNN) to predict which objects or products observable via the AR environment would be most and/or least appealing to the user for the current location cluster, as well as predict the type of products that are most likely to be selected for purchase by a user. Objects or products being selected by the RNN as replacement objects within the AR environment do not have to be objects or products currently offered for sale by the store or location the user may be viewing. Replacement objects being identified by the prediction engine 607 may be objects or products that might be available from other stores, websites commerce platforms or retailers since the selection of the objects or products being displayed by the AR device 301 can be drop shipped to the user from a separate location, warehouse or distributor of the replacement object 617, as discussed herein.

Once target object(s) 615 are identified that are a suitable replacement for the object(s) viewable to the user within an AR environment predicted to have a level of interest lower than a threshold level, AR output engine 609 can selectively replace one or more target objects 615 of the AR environment with one or more replacement objects 617 using an object overlay technique. The replacement object 617 may be an object or product predicted to have a probability of user-interaction that is above a threshold level due to prediction of user interest being higher than a threshold level based on the user's known preferences for the particular location cluster of the user's current location. Replacement objects 617 may be displayed to the user by rendering an image, video, or other data into an audio and/or visual artifact and overlaying or superimposing the rendered artifact of the replacement object 617 onto the target object 615, obscuring the target object from view while a user is viewing the AR environment via the AR interface 305 of the AR device 301. Overlay techniques may use the camera system 303 to capture the surrounding environment around the user to create a video stream of the surrounding environment. Target objects 615 within the video stream can be turned into a digital twin of the target object 615 stored by the AI system 310 or other system of a cloud network. The digital twin of the target object is a virtual rendering of the physical object viewed by the user and can therefore be manipulated within the AR environment. For instance, by superimposing the replacement object 617 over the digital twin of the target object 615 in order to create the AR environment comprising the one or more replacement objects 617.

In some embodiments, AR output engine 609 may prioritize replacement of the target objects 615 with the replacement object 617 having a highest confidence score or priority score using one or more object-overlay techniques. Replacement may occur in a decreasing order of priority scores computed for each object or location. For example, a user is visiting a street to shop and there is a plurality of shops to choose from. Shop 1 and shop 2 (with shop 2 being closer to the user's position), which are predicted have items bearing no interest to the user while shop 3 and shop 4 are out of the user's sight but predicted to be more interesting to the user. Shop 3 is predicted to have objects and products with a higher user interest than shop 4. Target objects 615 belonging to closest shop (shop 2) may be replaced with replacement objects 617 from most interesting shop to the user (shop 3), while target objects 615 within shop 1 are replaced with the replacement objects 617 from shop 4 which may have a lower priority score.

In some embodiments, the classification of objects and products can be re-classified and given higher priority scores as user actions, preferences, itinerary, budget or other contextual elements change over time for a location cluster. For example, a user may be visiting a vacation destination for 5 days. The user is not used to spicy food, therefore the AR device 301 does not display objects corresponding to spicy foods during the first four days of the vacation. However, on the final day of vacation, the classification engine 605 may increase an interest level expressed by a priority score (e.g., from uninterested to neutral or neutral to interested) in case the user does want to try some spicy food. The change in classification can result in an updated predictions whether the user would interact with the spicy food, making spicy food less likely to be a target object 615 that becomes replaced and/or more likely to become a replacement object 617 presented to the user.

Embodiments of the AR output engine 609 may additionally retrieve and/or apply object source identification 611 to the replacement objects 617. Replacement objects 617 may include viewable tags or images that can be viewed by the user within the AR environment and may may indicate the source of the replacement objects 617. For example, a brand, make, model, trademark or other identifying information indicating the source of the product or object being displayed within the AR environment. Object source identification 611 can be displayed and viewable within the AR interface 305. For instance, as the user is viewing the AR environment, the object source identification 611 may reference, point to, or be associated with the replacement object 617. In other instances, the user may be able to selectively view or toggle the visibility of the object source identification 611 while viewing the replacement object 617 within the AR interface 305. For example, by selecting the replacement object 617 using the AR interface 306 to view the object source identification 611.

In some embodiments of the object replacement module 307, the object replacement module 307 may integrate purchasing and shopping features into the AR interface 305, allowing users to directly initiate purchasing transactions for replacement objects 617 directly via the AR interface 305 and allow for the receipt of on-demand payment from the user. Shopping module 619 may perform tasks, functions and/or processes associated with facilitating and completing purchasing transactions on behalf of the user and seller of the replacement object 617. The user can conduct a commerce experience via the AR interface 305. For example, while viewing the AR interface 305, a user may select one or more replacement objects 617 using the AR interface 305 of the AR environment. Selection of the replacement object may initiate a potential purchase transaction, whereby the user can confirm the purchase of the replacement object, provide payment information, a shipping address, provide other purchase information and/or configure additional options. Upon confirming the purchase within the AR interface 305, shopping module 619 can complete the transaction by alerting the seller of the replacement object 617 about the transaction, receipt of payment and initiate shipping of the replacement object 617 to the shipping address provided by the user.

Figure 7:
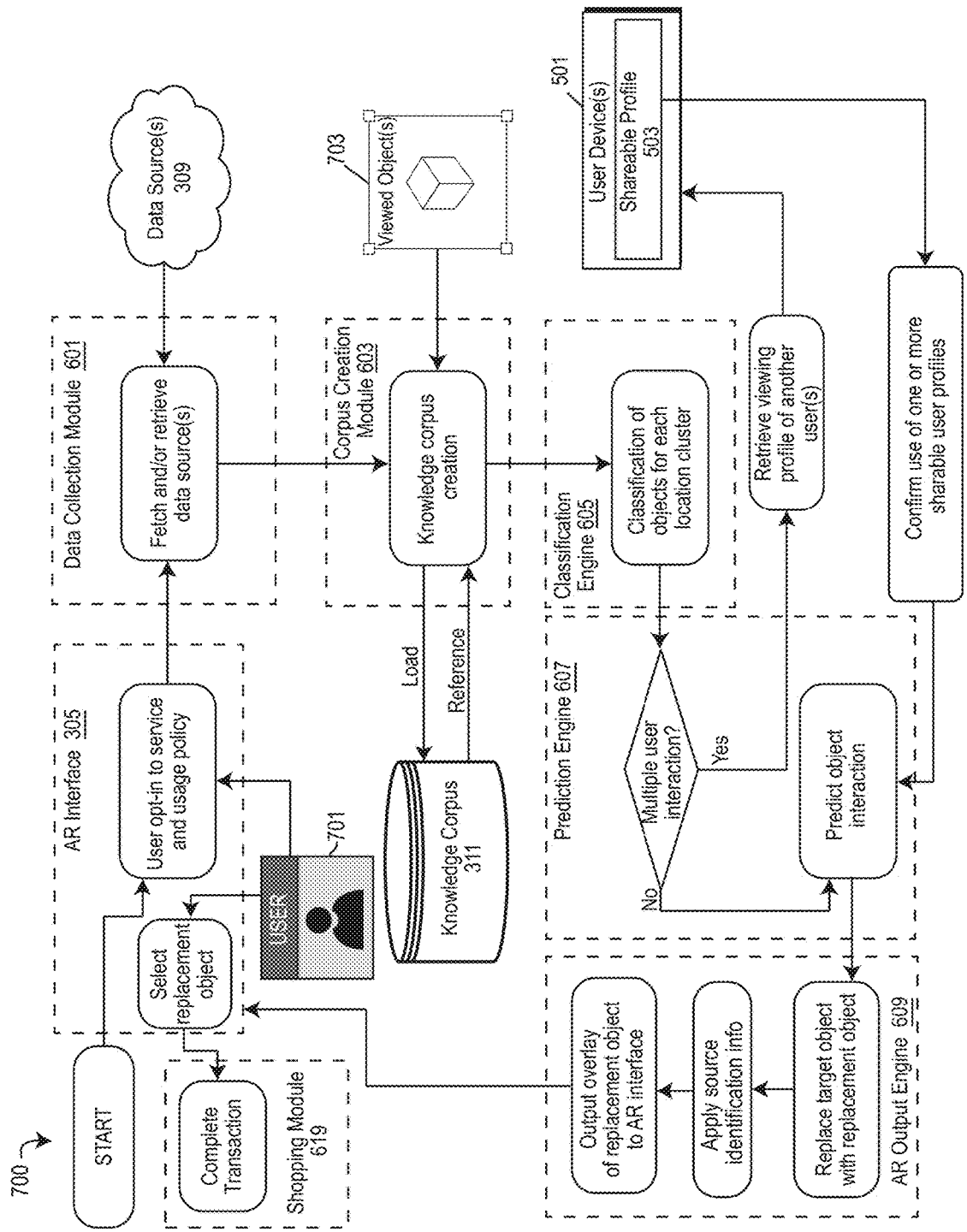
FIG. 7 depicts a workflow describing an embodiment of a method for selectively overlaying representations of physical objects within an augmented reality environment using computer-generated replacement objects that are viewable through an augmented reality device, based on the current location of the user within a location cluster and preferences of the user and/or user(s) sharing a profile for the location cluster, in accordance with the present disclosure.

FIG. 7 depicts a flow chart illustrating a workflow 700 describing a process for selectively replacing one or more objects displayed within an AR environment with one or more replacement objects predicted to be of a higher level of interest to the user than the target object(s) 615 being replaced and therefore more likely to be selected for purchase via the AR interface 305 than the target object 615. As illustrated by the workflow 700, a user 701 can opt-in to the object replacement services provided by the object replacement module 307. User 701 may opt-in to the object replacement features by configuring an AR application via the AR interface 305 and/or selecting one or more settings indicating the user 701 is opting into the object replacement features. As part of opting into the object replacement features, user 701 may be agreeing to the data usage policies of the augmented reality service 320 hosted by the AI system 310 or other computing system hosting one or more AR applications and services.

Once opting the object replacement features provided by object replacement module 307, data collection module 601 can fetch and/or retrieve user data and location information about the user from one or more data source(s) 309. Using the data fetched from the data sources 309, corpus creation module 603 instructs AI system 310 to create a knowledge corpus 311 and/or create or update one or more records of knowledge corpus 311. Corpus creation module 603 can analyze imported data from the data sources 309 to further understand the user's preferences based on the types of locations the user may be positioned when exhibiting certain preferences. The user data can be analyzed with respect to the user's interactions with the user's surroundings, the user's mobility patterns, user's product reviews including the overall positive or negative sentiment for a particular product, the shopping patterns and/or shopping behaviors of the user based on preferences, budgets, timings or other constraints, and/or the products attributes of objects or products viewed or purchased by the user, including color, shape, size, price, etc. Attributes of viewed object(s) 703 along with digital twin representations thereof, which may refer to objects or products previously viewed by the user 701, can be fetched and stored within the knowledge corpus 311 for further reference by the object replacement module 307, during classification, prediction and/or object overlay operations.

Following knowledge corpus creation, classification engine 605 can generate location clusters associated with the user 701 from the records stored by the knowledge corpus 311. For each of the location clusters being created, the classification engine 605 can classify objects and products previously observed by the user (i.e., viewed objects 703). Each of the viewed objects 703 can be classified based on a perceived level of interest a user may have for the viewed objects 703 and assign a value. The values assigned to the objects based on user preference data and location information can help the system predict objects that might receive a high likelihood of interaction from the user 701 within particular location clusters and derive prioritization of objects to replace when it comes to selectively replacing one or more objects within AR environments. In some instances, value assigned to objects can be a binary value (0 or 1) indicating simply whether or not the user 701 would like or dislike the object. The classified object may be assigned a value along a scale of values, such as a score that is 0 to 5, 0 to 10, 0 to 100, etc. An increasing score or value assigned to the viewed object 703 may indicate an increased priority for the user 701 within a location cluster. For instance, a viewed object 703 with a value assigned of 100 may be a top priority object with the highest level of user preference, whereas a viewed object 703 with a value of 75 may be a lower priority object to the user within a particular cluster than the object having a value of 100. Likewise, a viewed object with a value of 0 may be an object with absolutely no level of interest to the user and therefore is not prioritized at all.

In some embodiments, prediction engine 607 can make predictions based on classification of viewed object(s) 703 observed by not only user 701, but also based on known preferences of a third-party (i.e., a second user) within various location clusters. The prediction engine 607 may determine whether a multi-user interaction is occurring or not. If a multi-user interaction is being requested, the prediction engine 607 can retrieve a shareable profile 503 corresponding to the second user's preferences from a user device 501. The second user operating user device 501 can confirm whether or not to provide the shareable profile to the prediction engine 607. Upon confirmation by the second user, agreeing to share the shareable profile 503, the prediction engine 607 can predict which objects, within the current location cluster, that are viewable within the AR environment to replace a in accordance with the user preferences and object classifications of the shareable profile 503 provided by the third party.

Prediction engine 607 predicts a probability of interaction between the user 701 and one or more target objects 615 displayed by AR interface 305. Predictions can be made based on the parameters or attributes of the target objects 615 and the preferences of the user 701 (or user sharing a profile) for the current location cluster. Using the predictions provided by the prediction engine 607, AR output engine 609 can derive one or more replacement objects 617 based on user preferences and location. For example, using priority scores or values assigned to classified objects in order to prioritize which objects to selectively use during replacement of target objects 615 first. AR output engine 609 selectively replaces target objects 615 with replacement objects 617 being prioritized, by overlaying the target object 615 with an image, rendering or other computer-generated graphic, visual, or artifact. AR output engine 609 may tag or apply source identification information to the replacement object 617 and output the selective replacement of the target object 615 with the replacement object 617 to AR interface 305. User 701 viewing the AR interface 305 can visually see the image of the replacement object 617 within the AR environment instead of the target objects 615. User 701 can select the replacement object 617 via the AR interface 305 and complete a purchasing transaction via shopping module 619, within the AR interface 305 itself and/or via a computing system 101 placed in communication with AR device 301. For example, a mobile device, tablet, etc. Upon transaction completion, a physical embodiment of the replacement object 617 rendered within the AR interface 305, may be shipped to the user 701 in accordance with the shipping information or other details provided by the user 701 during the completion of the purchase transaction.

Figure 8A:
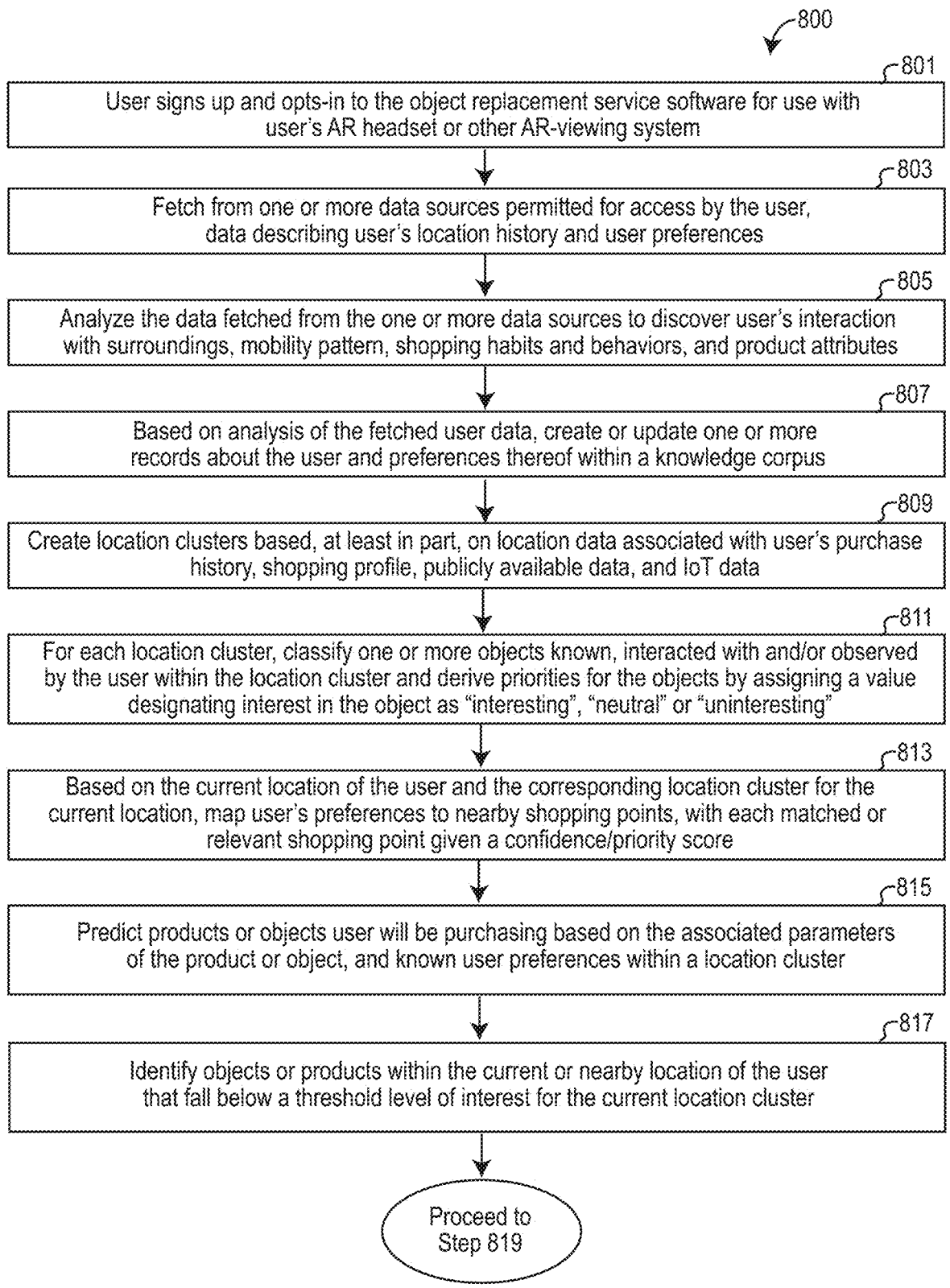
FIG. 8A illustrates a flow diagram describing an embodiment of a method for selectively overlaying representations of physical objects within an augmented reality environment with computer-generated replacement objects viewable through an augmented reality device, based on user preferences within a location cluster, in accordance with the present disclosure.
Figure 8B:
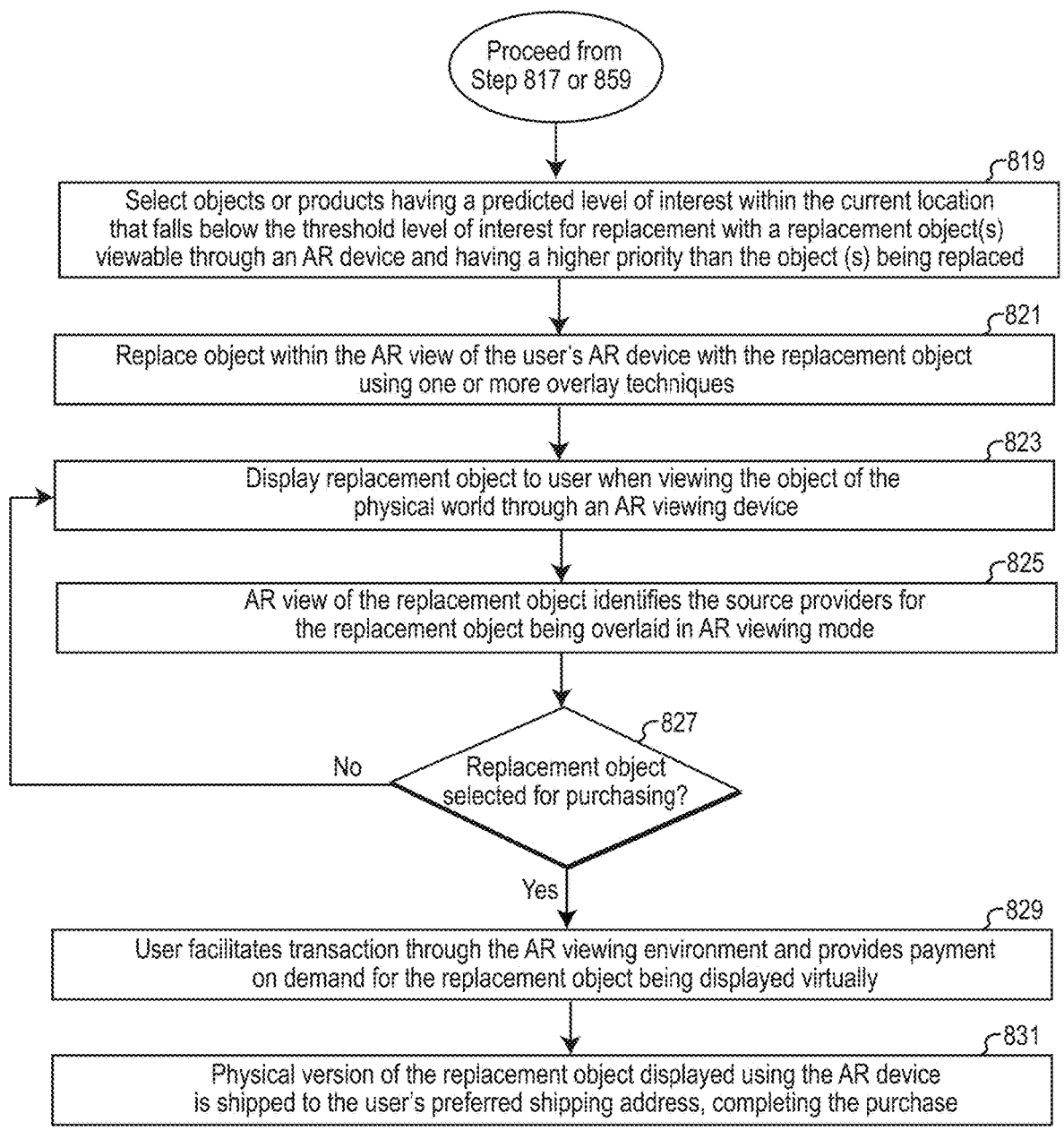
FIG. 8B illustrates a continuation of the flow diagram of FIG. 8A describing the embodiment of the method for selectively overlaying representations of physical objects within an augmented reality environment with computer-generated replacement objects viewable through an augmented reality device, based on user preferences within a location cluster, in accordance with the present disclosure.
Figure 8C:
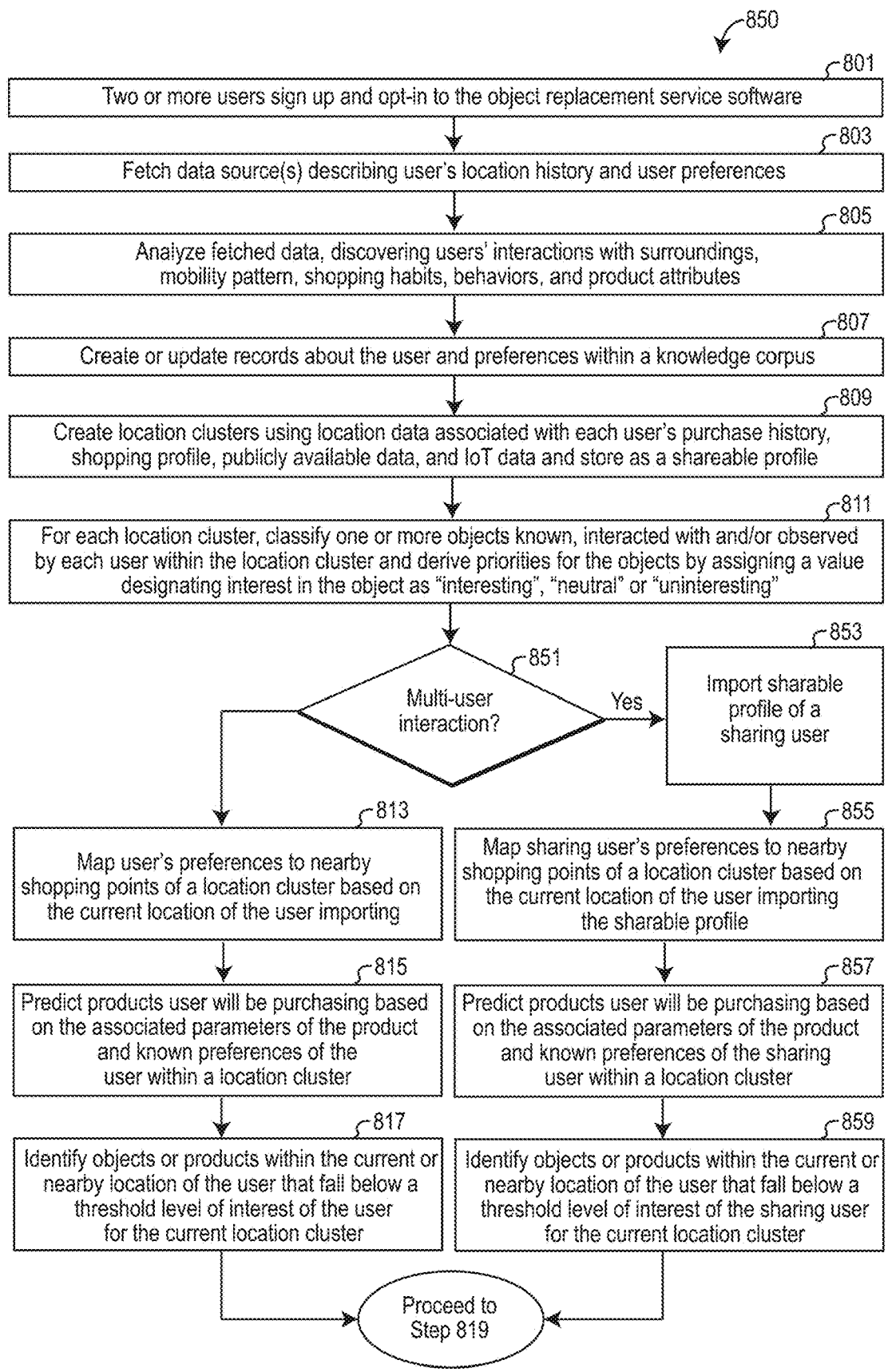
FIG. 8C illustrates a flow diagram describing an alternative embodiment of a method for selectively overlaying representations of physical objects within an augmented reality environment with computer-generated replacement objects, viewable through an augmented reality device, based on user preferences within a location cluster, in accordance with the present disclosure.

Method for Selectively Replacing Objects in an Augmented Reality Environment Based on Location Cluster The drawings of FIGS. 8A-8C represent embodiments of methods 800, 850 for selectively replacing objects in an augmented reality environment, based on the location of the user and the corresponding preferences of the user within a location cluster. Replacement objects rendered within the AR environment can be selectively overlay the physical objects of the surrounding environment when viewed through an augmented reality device 301. The embodiments of methods 800, 850 can be implemented in accordance with the computing systems and examples depicted in FIGS. 1-7 above and has described throughout this application. A person skilled in the art should recognize that the steps of the methods 800, 850 described in FIGS. 8A-8C may be performed in a different order than presented and may not require all the steps described herein to be performed.

The embodiment of method 800, as shown and described in FIG. 8A, may begin at step 801. During step 801, a user may sign up and opt into an augmented reality service 320 comprising object replacement features or functions of the service's software for use with an AR device 301. Opting into the object replacement features or functions of the service may include agreeing to a privacy policy disclosing data collection and usage by the object replacement services being added or integrated into the augmented reality service 320. During step 803, the data collection module 601 may direct one or more components of AI system 310 to fetch user data from one or more data sources 309. The data sources 309 being accessed by AI system 310 may be the data sources a user has granted permission to access or sources that are publicly available. AI engine 312 of the AI system 310 may, in step 805 analyze the data fetched from the one or more data sources 309. AI engine 312 may, based on the analysis of the user data discover and learn about the user, including the user's historical interactions with the user's surroundings, the user's mobility patterns, product preferences based on user reviews, historical shopping patterns and behaviors, and the types of product attributes a user prefers, including product colors, shapes, sizes, prices, etc. In step 807, corpus creation module 603 may create a knowledge corpus 311 or update one or more records of a knowledge corpus 311, organizing the historical habits of the user, user preferences, behaviors and other inferences about the user from the analyzed data based on location. The newly created or updated records of the knowledge corpus 311 may describe and/or indicate user preferences for specific products and/or objects the user has historically viewed or come into contact with as well as location information describing the context upon which the user may have viewed or come into contact with an object or product.

During step 809, one or more location clusters for each user may be created. The creation of location clusters may be identified based (at least in part) on location data collected by the data collection module 601 and associated with a user's purchase history, shopping profile, publicly available data, IOT data and/or other types of data collected and analyzed in steps 805 and 807. In step 811, for each location cluster identified, a classification engine 605 may classify one or more objects which may have been interacted with, and/or observed by the user within the identified location clusters. Classification engine 605 may derive priorities for one or more objects for each user based on the location cluster and assign a level interest, priority score and/or confidence interval for the objects previously viewed or interreacted with by each user. For example, by assigning a value to the object which may designate a user's interest in the historically viewed objects or products, such as a binary value of 0 or 1 indicating whether the user is interested or not interested. In other embodiments, the value assigned to the object may be a priority score along a scale of potential values. For instance, a value between 0 to 5, whereby 0 indicates absolutely no interest by the user, a value of 3 may indicate a neutral amount of interest and a value of 5 indicates a high level of interest. Scores with higher values may be prioritized as being of higher interest to the user within the location cluster than objects having lower values.

In step 813, the classification engine 609 may, based on the current location of the user, and the corresponding location cluster for the current position of the user, map user preferences to nearby points of interest, including shopping points, and/or objects within the points of interests. Within each matched or relevant point of interest, a priority score or confidence score may be computed for each object captured by the camera system 303 and thus being viewed by the user via the AR interface 305. In step 815, prediction engine 607 may predict which products or objects a user may purchase or choose to interact with, based on the associated parameters of objects and products viewable to the user, as captured via the camera system 303 of the AR device 301. Predictions describing the probability of purchasing or interacting with an object or product may be based on the associated parameters of the product or object and known user preferences for particular attributes of the products or objects within a particular location cluster. For example, products having similar attributes to objects classified with a high priority score or classified as "interesting" to the user within the location cluster, may have a prediction indicating a higher probability of interaction while objects being viewed by the camera system 303 that have similar attributes to objects classified as uninteresting have a much lower probability of interaction or purchase by the user.

In step 817, objects and products within the current or nearby location are identified that are predicted to fall below a threshold level of interest for the user within the current location cluster. These identified objects may be referred to as "target objects 615". In step 819, the AR output engine selects for replacement one or more target objects 615 being viewed by the user that have a predicted level of interest within the current location that falls below a threshold level of interest for the location cluster. The target objects 615 are selected for replacement with one or more replacement objects 617 having a higher priority level of interest to the user based on the user's known historical patterns of interest in products or objects having certain attributes in a particular location cluster.

During step 821, AR output engine 609 replaces each of the target objects 615 being viewed by the user via the AR interface 305 with one or more replacement object 617 using one or more overlay techniques which may render a computer-graphic of the replacement object 617 over the target object 615, obscuring from the user's view the target object while the user is viewing the AR interface 305 using the AR device 301. In the exemplary embodiment, target objects closest to the user may be replaced with replacement objects 617 known to have a higher priority score or higher level of interest to the user. As target objects 615 are further away from the user, the replacement objects 617 may have a descending level of priority or predicted level of interest to the user. In step 823, the replacement object 617 is displayed to the user while viewing the AR interface 305 instead of the target object 615, which may be present in the real world when the user removes the AR device 301 from the user's line of sight or viewing position. In step 825, the AR interface 305 may display the object source identification 611 for the replacement object 617 when viewed on the AR interface 305.

During step 827, a determination may be made whether or not the replacement object 617 presented within the AR interface 305 is being selected by the user for purchase. If the replacement object 617 is not selected for purchase by the user, the method 800 may return to step 823 whereby the AR interface 305 may continue displaying the replacement objects 617 on the AR interface 305 while the user is viewing the AR environment via AR device 301. Conversely, if a user has selected a replacement object 617 for purchase via the AR interface 305, the method may proceed to step 829. During step 829, the user may facilitate the purchasing transaction through the AR interface 305 by providing payment-on-demand for the replacement object 617 being displayed virtually. During completion of the purchasing transaction, the user may also provide shipping information and other user information for completing the transaction. During step 831, upon completion of the payment-on-demand and input of shipping information, a physical version of the replacement object 617 may be shipped to the user's preferred shipping location, completing the purchase transaction.

Referring to the drawings, FIG. 8C depicts an alternative method 850 for replacing objects within an AR environment based on user preferences within a particular location cluster. As shown in alternative method 850, steps 801-811 are consistent with the steps as described above with regard to method 800. However, alternative method 850 further considers in step 851 whether or not there is a multi-user interaction, and if so, whether or not to consider the user preferences for a location cluster to predict whether a second user would prefer one or more particular objects being viewed by the first user via AR device 301. The replacement of the objects being viewed by the first user will be based on the second user's preferences and not their own. In step 851, if there is a multi-user interaction, the alternative method 850 may proceed to step 853 whereby in step 853, user preferences are provided to the AI system 310 by importing a shareable profile 503 associated with the second user (i.e., the "sharing user") into the prediction engine 607.

Upon importing the shareable profile into the prediction engine 607, in step 855, the sharing user's preferences can be mapped to nearby points of interests and shopping points for the location cluster based on the current location of the user operating the AR device 301. In step 857, the user operating the AR device 301 may be capturing visuals of the user's surroundings, including one or more visible objects or products. The prediction engine 607 may predict which products or objects the "sharing user" would interact with, purchase or have interest in (if they were present), based on the associated parameters of the products or objects being viewed compared with the known attributes and preferences of the sharing user's imported shareable profile 503. Based on the known preferences and attributes classified as being of interest to the sharing user (for the current location cluster), and predictions made using said known preferences and attributes. In step 859, one or more target objects 615 may be identified within the current or nearby location to the user of the AR device 301, having a level of interest for the sharing user that falls below a threshold level of interest for the sharing user for the current location cluster.

The alternative method 850 may proceed from step 859 to step 819 as described above, whereby the AR output engine 609 may select and replace target objects 615 predicted to have a level of interest within the current location cluster that falls below the threshold level of interest with replacement objects 617 having a level of interest above a threshold level (based on the sharing user's preferences). Target objects 615 that are identified are selectively replaced within the AR interface 305 with replacement objects 617. Such a replacement using replacement objects 617 predicted to have a high level of interest or priority score for the sharing user may provide insight to the user operating the AR device 301 and may allow the user operating the AR device 301 to make purchasing decisions on behalf of the sharing user, based on the preferences and interests of the sharing user. Allowing the user to select objects, complete transactions and have products shipped to a preferred address of the user or the sharing user.

What is claimed is:

1. A computer-implemented method comprising:

creating, by an artificial intelligence (AI) system, a knowledge corpus associated with a user based on one or more data sources to which the user permits access, including historical data, internet of things (IoT) data, social media, and global positioning system (GPS) data from wearable devices;

creating one or more location clusters from the user knowledge corpus;

classifying, by the AI system, a level of interest in one or more objects observed by the user within at least one of the location clusters, wherein the level of interest is designated by assigning a value to the one or more objects of the location clusters;

importing, by the AI system, a sharable profile of a second user, wherein the sharable profile classifies the level of interest in one or more objects observed by the second user within each of the location clusters and assigns the values to the one or more objects of the location clusters based on the sharable profile;

predicting, by the AI system, one or more objects, within a physical environment of a current location being observed by the user, having a level of interest for the second user below a threshold level for the location cluster corresponding to the current location based on the sharable profile;

selectively replacing, by the AI system, the one or more objects of the current location having the level of interest for the second user below the threshold level by overlaying a rendered image of a replacement object that is viewable through an augmented reality (AR) viewing device, wherein the replacement object has the level of interest of the second user that is above a threshold level for the location cluster corresponding to the current location; and displaying, by the AI system, the replacement object having the level of interest for the second user that is above the threshold level for the location cluster within the AR viewing device operated by the user.

2. The computer-implemented method of claim 1, wherein the values indicating the level of interest of the user in the one or more objects is independently calculated for each of the location clusters, wherein a first object observed as part of a first location cluster can have a different level of interest compared with the first object observed as part of a second location cluster.

3. The computer-implemented method of claim 1, wherein visuals of the one or more objects observed by the user within each of the location clusters is captured through IoT infrastructure of the AR viewing device.

4. A computer system comprising:
a processor; and
a computer-readable storage media coupled to the processor, wherein the computer-readable storage media contains program instructions executing, via the processor, a computer-implemented method comprising:
creating, by an artificial intelligence (AI) system, a knowledge corpus associated with a user based on one or more data sources to which the user permits access, including historical data, internet of things (IoT) data, social media, and global positioning system (GPS) data from wearable devices;
creating one or more location clusters from the user knowledge corpus;
classifying, by the AI system, a level of interest in one or more objects observed by the user within at least one of the location clusters, wherein the level of interest is designated by assigning a value to the one or more objects of the location clusters;
importing, by the AI system, a sharable profile of a second user, wherein the sharable profile classifies the level of interest in one or more objects observed by the second user within each of the location clusters and assigns the values to the one or more objects of the location clusters based on the sharable profile;
predicting, by the AI system, one or more objects, within a physical environment of a current location being observed by the user, having a level of interest for the second user below a threshold level for the location cluster corresponding to the current location based on the sharable profile;
selectively replacing, by the AI system, the one or more objects of the current location having the level of interest for the second user below the threshold level by overlaying a rendered image of a replacement object that is viewable through an augmented reality (AR) viewing device, wherein the replacement object has the level of interest of the second user that is above a threshold level for the location cluster corresponding to the current location; and
displaying, by the AI system, the replacement object having the level of interest for the second user that is above the threshold level for the location cluster within the AR viewing device operated by the user.

5. The computer system of claim 4, wherein the values indicating the level of interest of the user in the one or more objects is independently calculated for each of the location clusters, wherein a first object observed as part of a first location cluster can have a different level of interest compared with the first object observed as part of a second location cluster.

6. The computer system of claim 4, wherein visuals of the one or more objects observed by the user within each of the location clusters is captured through IoT infrastructure of the AR viewing device.

7. A computer program product comprising:
one or more computer readable storage media having computer-readable program instructions stored on the one or more computer readable storage media, said program instructions executes a computer-implemented method comprising:
creating, by an artificial intelligence (AI) system, a knowledge corpus associated with a user based on one or more data sources to which the user permits access, including historical data, internet of things (IoT) data, social media, and global positioning system (GPS) data from wearable devices;
creating one or more location clusters from the user knowledge corpus;
classifying, by the AI system, a level of interest in one or more objects observed by the user within at least one of the location clusters, wherein the level of interest is designated by assigning a value to the one or more objects of the location clusters;
importing, by the AI system, a sharable profile of a second user, wherein the sharable profile classifies the level of interest in one or more objects observed by the second user within each of the location clusters and assigns the values to the one or more objects of the location clusters based on the sharable profile;
predicting, by the AI system, one or more objects, within a physical environment of a current location being observed by the user, having a level of interest for the second user below a threshold level for the location cluster corresponding to the current location based on the sharable profile;
selectively replacing, by the AI system, the one or more objects of the current location having the level of interest for the second user below the threshold level by overlaying a rendered image of a replacement object that is viewable through an augmented reality (AR) viewing device, wherein the replacement object has the level of interest of the second user that is above a threshold level for the location cluster corresponding to the current location; and
displaying, by the AI system, the replacement object having the level of interest for the second user that is above the threshold level for the location cluster within the AR viewing device operated by the user.

8. The computer program product of claim 7, wherein the values indicating the level of interest of the user in the one or more objects is independently calculated for each of the location clusters, wherein a first object observed as part of a first location cluster can have a different level of interest compared with the first object observed as part of a second location cluster.

9. The computer program product of claim 7, wherein visuals of the one or more objects observed by the user within each of the location clusters is captured through IoT infrastructure of the AR viewing device.

\* \* \* \* \*